US012608413B2

(12) United States Patent
Unnikrishnan et al.

(10) Patent No.: US 12,608,413 B2
(45) Date of Patent: Apr. 21, 2026

(54) TRANSCREATION OF TEXTUAL CONTENT USING A LANGUAGE MODEL

(71) Applicant: ADOBE INC., San Jose, CA (US)

(72) Inventors: Soumya Unnikrishnan, Austin, TX (US); Michele Saad, Austin, TX (US); Deepak Pai, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/917,491

(22) Filed: Oct. 16, 2024

(65) Prior Publication Data

US 2026/0105096 A1     Apr. 16, 2026

(51) Int. Cl.
| | |
|---|---|
| *G06F 16/33* | (2025.01) |
| *G06F 16/334* | (2025.01) |
| *G06F 16/35* | (2025.01) |
| *G06F 16/353* | (2025.01) |

(52) U.S. Cl.
CPC ........ *G06F 16/353* (2019.01); *G06F 16/3344* (2019.01)

(58) Field of Classification Search
CPC ........................... G06F 16/353; G06F 16/3344
See application file for complete search history.

(56) References Cited

U.S. PATENT DOCUMENTS

| | | | | |
|---|---|---|---|---|
| 8,484,245 | B2 * | 7/2013 | Ha-Thuc ................. | G06F 16/35 707/777 |
| 10,373,067 | B1 * | 8/2019 | Chen ................... | G06F 16/3344 |
| 11,238,076 | B2 * | 2/2022 | Roitman ............... | H04L 51/046 |
| 12,406,013 | B1 * | 9/2025 | Nadig ..................... | G10L 15/22 |
| 2004/0064807 | A1 * | 4/2004 | Rose ....................... | G06F 9/454 717/145 |
| 2019/0325066 | A1 * | 10/2019 | Krishna ............... | G06N 3/0455 |
| 2025/0124218 | A1 * | 4/2025 | Sheng .................. | G06F 40/137 |
| 2025/0131121 | A1 * | 4/2025 | Teng .................... | G10L 15/183 |
| 2025/0139353 | A1 * | 5/2025 | Ordorica de la Torre .................. G06F 40/169 |
| 2025/0156642 | A1 * | 5/2025 | Serry .................... | G06F 40/284 |
| 2025/0173555 | A1 * | 5/2025 | Luus .................... | G06F 21/602 |

* cited by examiner

*Primary Examiner* — Debbie M Le
(74) *Attorney, Agent, or Firm* — Shook, Hardy & Bacon L.L.P.

(57) ABSTRACT

Methods and systems are provided for transcreation of textual content using a language model. In embodiments described herein, a user inputs content and selects a target locale to transcreate the content for the target locale. A language model is prompted to classify textual portions of the content into popular-topic categories of a popular-topic taxonomy and determine a subject of each of popular-topic categories based on the classified textual portions. The language model is prompted to determine a substitution subject relevant to the target locale based on the subject of each popular-topic category. Refined content is generated by replacing the classified textual portions of the content with text corresponding to the substitution subject. Transcreated content is generated by prompting the language model to generate the transcreated content based on the refined content and communication-interpretation rules relevant to the target locale. The transcreated content is displayed to the user.

20 Claims, 12 Drawing Sheets

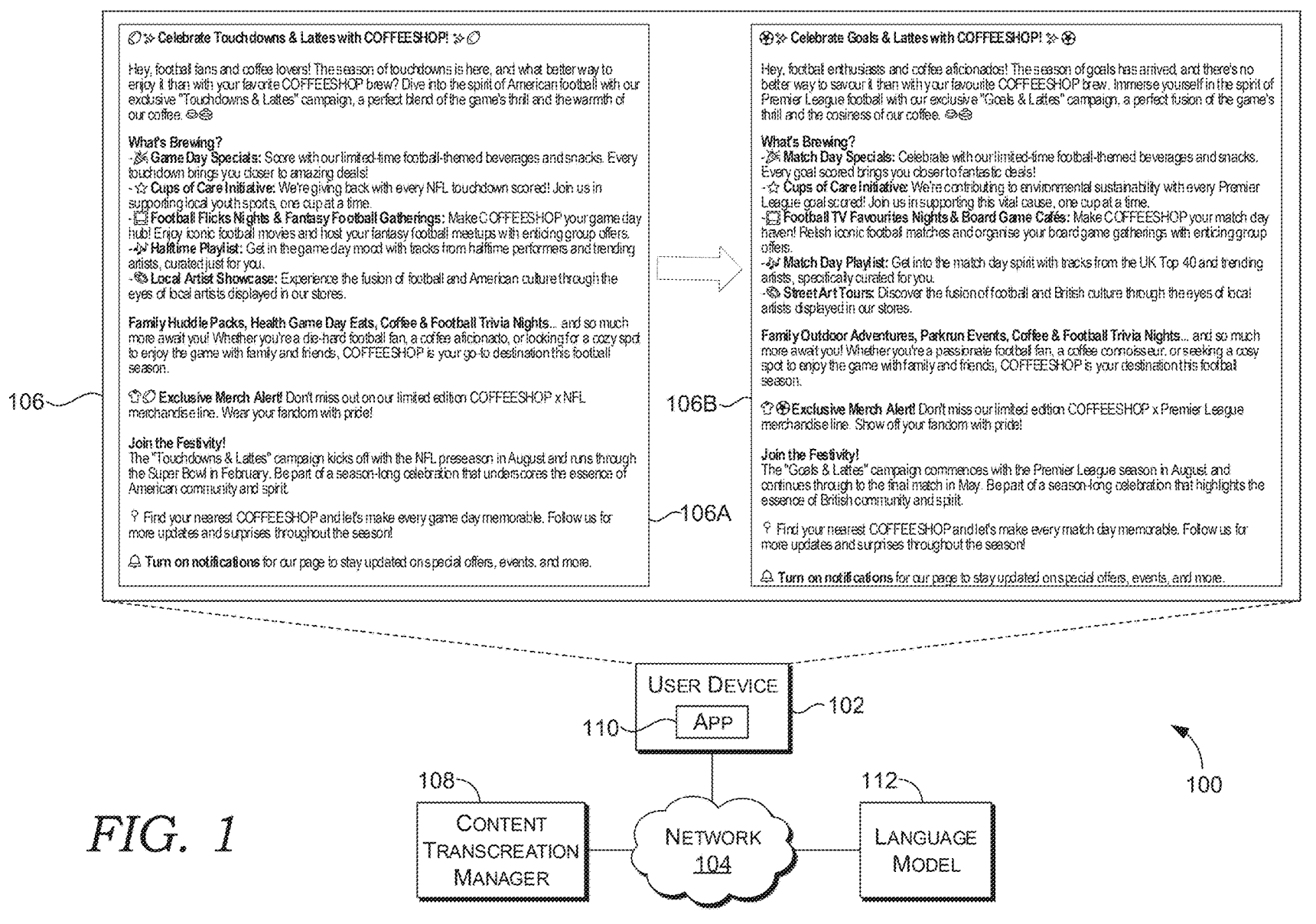

106A

⚑ Celebrate Touchdowns & Lattes with COFFEESHOP! 🏈

Hey, football fans and coffee lovers! The season of touchdowns is here, and what better way to enjoy it than with your favorite COFFEESHOP brew? Dive into the spirit of American football with our exclusive "Touchdowns & Lattes" campaign, a perfect blend of the game's thrill and the warmth of our coffee. ☕

What's Brewing?
- 🏈 Game Day Specials: Score with our limited-time football-themed beverages and snacks. Every touchdown brings you closer to amazing deals!
- ☆ Cups of Care Initiative: We're giving back with every NFL touchdown scored! Join us in supporting local youth sports, one cup at a time.
- 📺 Football Flicks Nights & Fantasy Football Gatherings: Make COFFEESHOP your game day hub! Enjoy iconic football movies and host your fantasy football meetups with enticing group offers.
- 🎵 Halftime Playlist: Get in the game day mood with tracks from halftime performers and trending artists, curated just for you.
- 🎨 Local Artist Showcase: Experience the fusion of football and American culture through the eyes of local artists displayed in our stores.

Family Huddle Packs, Health Game Day Eats, Coffee & Football Trivia Nights... and so much more await you! Whether you're a die-hard football fan, a coffee aficionado, or looking for a cozy spot to enjoy the game with family and friends, COFFEESHOP is your go-to destination this football season.

🎁 Exclusive Merch Alert! Don't miss out on our limited edition COFFEESHOP x NFL merchandise line. Wear your fandom with pride!

Join the Festivity!
The "Touchdowns & Lattes" campaign kicks off with the NFL preseason in August and runs through the Super Bowl in February. Be part of a season-long celebration that underscores the essence of American community and spirit.

📍 Find your nearest COFFEESHOP and let's make every game day memorable. Follow us for more updates and surprises throughout the season!

🔔 Turn on notifications for our page to stay updated on special offers, events, and more.

106B

⚽ Celebrate Goals & Lattes with COFFEESHOP! ⚽

Hey, football enthusiasts and coffee aficionados! The season of goals has arrived and there's no better way to savour it than with your favourite COFFEESHOP brew. Immerse yourself in the spirit of Premier League football with our exclusive "Goals & Lattes" campaign, a perfect fusion of the game's thrill and the cosiness of our coffee. ☕

What's Brewing?
- ⚽ Match Day Specials: Celebrate with our limited-time football-themed beverages and snacks! Every goal scored brings you closer to fantastic deals!
- ☆ Cups of Care Initiative: We're contributing to environmental sustainability with every Premier League goal scored! Join us in supporting this vital cause, one cup at a time.
- 📺 Football TV Favourites Nights & Board Game Cafes: Make COFFEESHOP your match day hub! Relish iconic football matches and organise your board game gatherings with enticing group offers.
- 🎵 Match Day Playlist: Get into the match day spirit with tracks from the UK Top 40 and trending artists, specifically curated for you.
- 🎨 Street Art Tours: Discover the fusion of football and British culture through the eyes of local artists displayed in our stores.

Family Outdoor Adventures, Parkrun Events, Coffee & Football Trivia Nights... and so much more await you! Whether you're a passionate football fan, a coffee connoisseur, or seeking a cosy spot to enjoy the game with family and friends, COFFEESHOP is your destination this football season.

🎁 Exclusive Merch Alert! Don't miss our limited edition COFFEESHOP x Premier League merchandise line. Show off your fandom with pride!

Join the Festivity!
The "Goals & Lattes" campaign commences with the Premier League season in August and continues through to the final match in May. Be part of a season-long celebration that highlights the essence of British community and spirit.

📍 Find your nearest COFFEESHOP and let's make every match day memorable. Follow us for more updates and surprises throughout the season!

🔔 Turn on notifications for our page to stay updated on special offers, events, and more.

106

100

USER DEVICE 102

APP 110

NETWORK 104

CONTENT TRANSCREATION MANAGER 108

LANGUAGE MODEL 112

*FIG. 1*

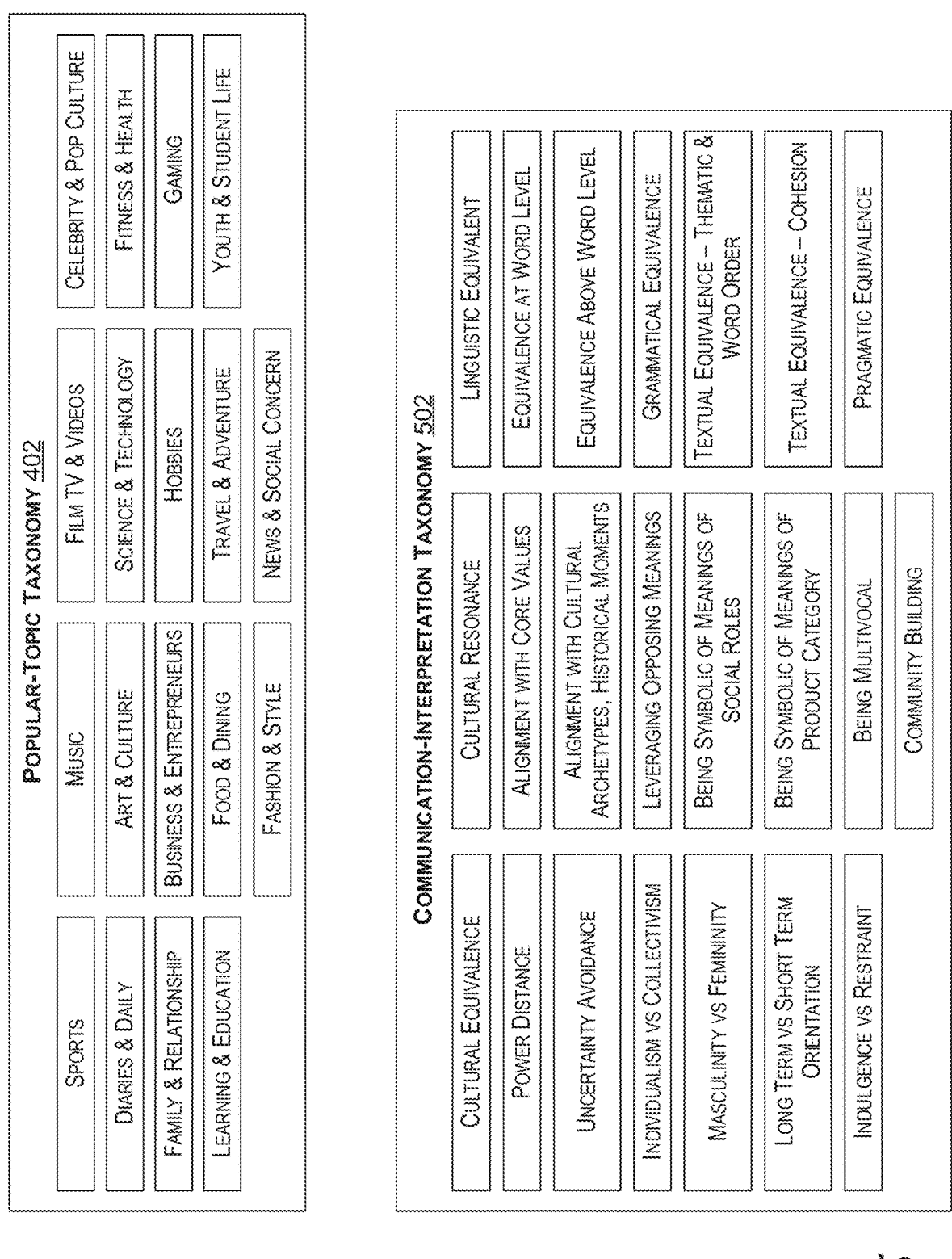

POPULAR-TOPIC TAXONOMY 402

| | | | |
|---|---|---|---|
| SPORTS | MUSIC | FILM TV & VIDEOS | CELEBRITY & POP CULTURE |
| DIARIES & DAILY | ART & CULTURE | SCIENCE & TECHNOLOGY | FITNESS & HEALTH |
| FAMILY & RELATIONSHIP | BUSINESS & ENTREPRENEURS | HOBBIES | GAMING |
| LEARNING & EDUCATION | FOOD & DINING | TRAVEL & ADVENTURE | YOUTH & STUDENT LIFE |
| | FASHION & STYLE | NEWS & SOCIAL CONCERN | |

COMMUNICATION-INTERPRETATION TAXONOMY 502

| | | |
|---|---|---|
| CULTURAL EQUIVALENCE | CULTURAL RESONANCE | LINGUISTIC EQUIVALENT |
| POWER DISTANCE | ALIGNMENT WITH CORE VALUES | EQUIVALENCE AT WORD LEVEL |
| UNCERTAINTY AVOIDANCE | ALIGNMENT WITH CULTURAL ARCHETYPES, HISTORICAL MOMENTS | EQUIVALENCE ABOVE WORD LEVEL |
| INDIVIDUALISM VS COLLECTIVISM | LEVERAGING OPPOSING MEANINGS | GRAMMATICAL EQUIVALENCE |
| MASCULINITY VS FEMININITY | BEING SYMBOLIC OF MEANINGS OF SOCIAL ROLES | TEXTUAL EQUIVALENCE – THEMATIC & WORD ORDER |
| LONG TERM VS SHORT TERM ORIENTATION | BEING SYMBOLIC OF MEANINGS OF PRODUCT CATEGORY | TEXTUAL EQUIVALENCE – COHESION |
| INDULGENCE VS RESTRAINT | BEING MULTIVOCAL | PRAGMATIC EQUIVALENCE |
| | COMMUNITY BUILDING | |

Figure 7:
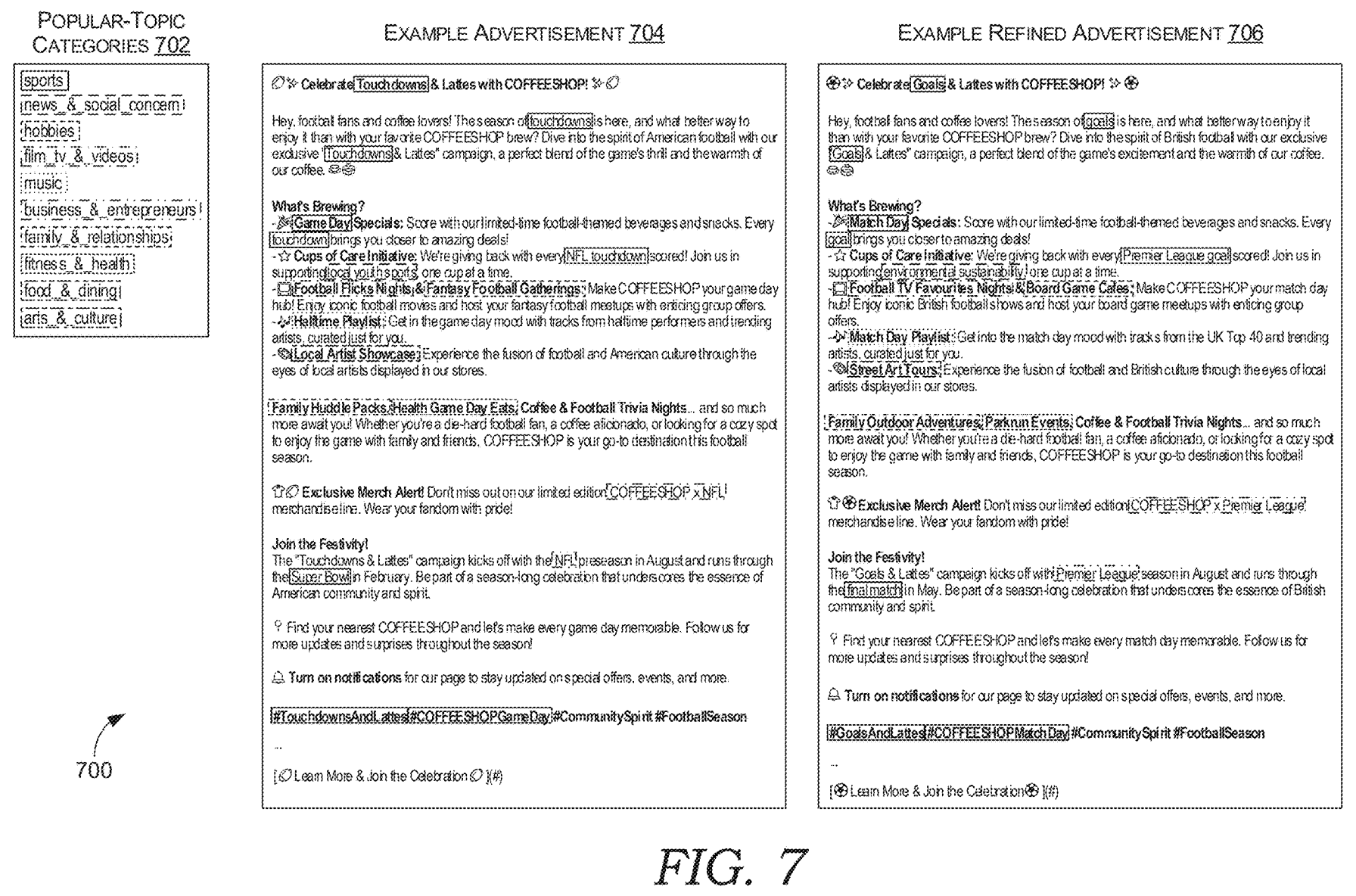

POPULAR-TOPIC CATEGORIES 702

- sports
- news_&_social_concern
- hobbies
- film_tv_&_videos
- music
- business_&_entrepreneurs
- family_&_relationships
- fitness_&_health
- food_&_dining
- arts_&_culture

EXAMPLE ADVERTISEMENT 704

✏️☆ Celebrate [Touchdowns] & Lattes with COFFEESHOP! ☆⚲

Hey, football fans and coffee lovers! The season of [touchdowns] is here, and what better way to enjoy it than with your favorite COFFEESHOP brew? Dive into the spirit of American football with our exclusive [Touchdowns] & Lattes" campaign, a perfect blend of the game's thrill and the warmth of our coffee. ☕🏈

What's Brewing?

🏈[Game Day] Specials: Score with our limited-time football-themed beverages and snacks. Every [touchdown] brings you closer to amazing deals!

☆ Cups of Care Initiative: We're giving back with every [NFL touchdown] scored! Join us in supporting [local youth sports] one cup at a time.

📺 Football Flicks Nights & Fantasy Football Gatherings: Make COFFEESHOP your game day hub! Enjoy iconic football movies and host your fantasy football meetups with enticing group offers.

🎶 Halftime Playlist: Get in the game day mood with tracks from halftime performers and trending artists, curated just for you.

🎨 Local Artist Showcase: Experience the fusion of football and American culture through the eyes of local artists displayed in our stores.

!Family Huddle Packs & Health Game Day Eats; Coffee & Football Trivia Nights... and so much more await you! Whether you're a die-hard football fan, a coffee aficionado, or looking for a cozy spot to enjoy the game with family and friends, COFFEESHOP is your go-to destination this football season.

⬆⚲ Exclusive Merch Alert Don't miss out on our limited edition [COFFEESHOP x NFL] merchandise line. Wear your fandom with pride!

Join the Festivity!
The "Touchdowns & Lattes" campaign kicks off with the [NFL] preseason in August and runs through the [Super Bowl] in February. Be part of a season-long celebration that underscores the essence of American community and spirit.

♀ Find your nearest COFFEESHOP and let's make every game day memorable. Follow us for more updates and surprises throughout the season!

🔔 Turn on notifications for our page to stay updated on special offers, events, and more.

[#Touchdowns And Lattes #COFFEESHOP Game Day #Community Spirit #Football Season]

[🔵⚲ Learn More & Join the Celebration ♡ ][#]

EXAMPLE REFINED ADVERTISEMENT 706

⚽☆ Celebrate [Goals] & Lattes with COFFEESHOP! ☆ ⚽

Hey, football fans and coffee lovers! The season of [goals] is here, and what better way to enjoy it than with your favorite COFFEESHOP brew? Dive into the spirit of British football with our exclusive [Goals] & Lattes" campaign, a perfect blend of the game's excitement and the warmth of our coffee. ☕😊

What's Brewing?

⚽[Match Day] Specials: Score with our limited-time football-themed beverages and snacks. Every [goal] brings you closer to amazing deals!

☆ Cups of Care Initiative: We're giving back with every [Premier League goal] scored! Join us in supporting [environmental sustainability] one cup at a time.

📺 Football TV Favourites Nights & Board Game Cafes: Make COFFEESHOP your match day hub! Enjoy iconic British football shows and host your board game meetups with enticing group offers.

🎶 Match Day Playlist: Get into the match day mood with tracks from the UK Top 40 and trending artists, curated just for you.

🎨 Street Art Tours: Experience the fusion of football and British culture through the eyes of local artists displayed in our stores.

[Family Outdoor Adventures & Parkrun Events; Coffee & Football Trivia Nights... and so much more await you! Whether you're a die-hard football fan, a coffee aficionado, or looking for a cozy spot to enjoy the game with family and friends, COFFEESHOP is your go-to destination this football season.

⬆⚲ Exclusive Merch Alert Don't miss our limited edition [COFFEESHOP x Premier League] merchandise line. Wear your fandom with pride!

Join the Festivity!
The "Goals & Lattes" campaign kicks off with [Premier League season] in August and runs through the [final match] in May. Be part of a season-long celebration that underscores the essence of British community and spirit.

♀ Find your nearest COFFEESHOP and let's make every match day memorable. Follow us for more updates and surprises throughout the season!

🔔 Turn on notifications for our page to stay updated on special offers, events, and more.

[#Goals And Lattes #COFFEESHOP Match Day #Community Spirit #Football Season]

[🔵⚲ Learn More & Join the Celebration ⚽ ][#]

Figure 8A:
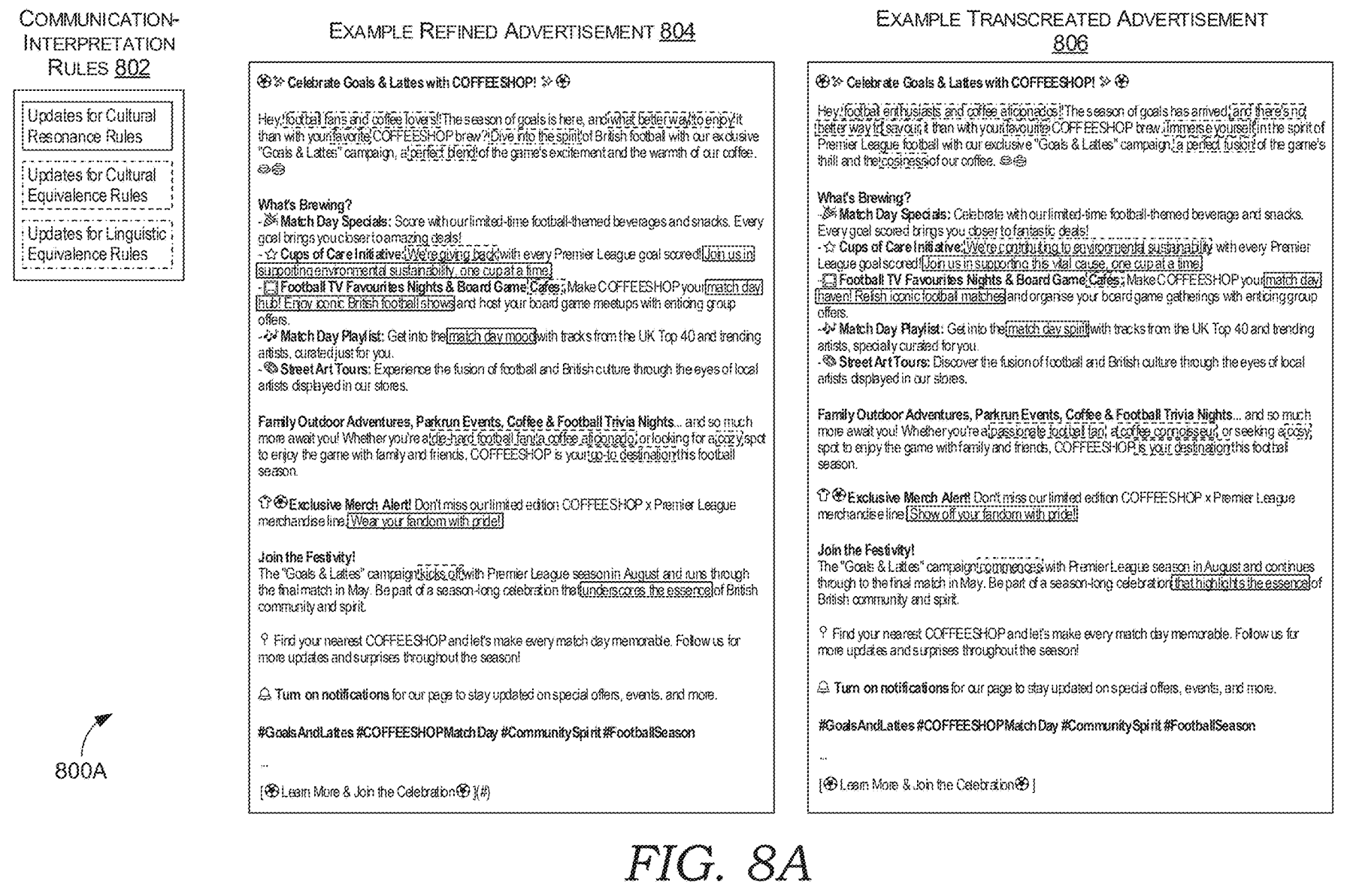

COMMUNICATION-
INTERPRETATION
RULES 802

Updates for Cultural
Resonance Rules

Updates for Cultural
Equivalence Rules

Updates for Linguistic
Equivalence Rules

EXAMPLE REFINED ADVERTISEMENT 804

⚽ ✨ Celebrate Goals & Lattes with COFFEESHOP! ≫ ⚽

Hey, football fans and coffee lovers! The season of goals is here, and what better way to enjoy it than with your favorite COFFEESHOP brew? Dive into the spirit of British football with our exclusive "Goals & Lattes" campaign, a perfect blend of the game's excitement and the warmth of our coffee. ⚽☕

What's Brewing?
- ⚽ Match Day Specials: Score with our limited-time football-themed beverages and snacks. Every goal brings you closer to amazing deals!
- ☆ Cups of Care Initiative: We're giving back with every Premier League goal scored! Join us in supporting environmental sustainability, one cup at a time!
- 📺 Football TV Favourites Nights & Board Game Cafes: Make COFFEESHOP your match day hub! Enjoy iconic British football shows and host your board game meetups with enticing group offers.
- 🎵 Match Day Playlist: Get into the match day mood with tracks from the UK Top 40 and trending artists, curated just for you.
- 🎨 Street Art Tours: Experience the fusion of football and British culture through the eyes of local artists displayed in our stores.

Family Outdoor Adventures, Parkrun Events, Coffee & Football Trivia Nights... and so much more await you! Whether you're a die-hard football fan, a coffee aficionado, or looking for a cozy spot to enjoy the game with family and friends, COFFEESHOP is your go-to destination this football season.

🎁 ⚽ Exclusive Merch Alert! Don't miss our limited edition: COFFEESHOP x Premier League merchandise line. Wear your fandom with pride!

Join the Festivity!
The "Goals & Lattes" campaign kicks off with Premier League season in August and runs through the final match in May. Be part of a season-long celebration that underscores the essence of British community and spirit.

📍 Find your nearest COFFEESHOP and let's make every match day memorable. Follow us for more updates and surprises throughout the season!

🔔 Turn on notifications for our page to stay updated on special offers, events, and more.

GoalsAndLattes #COFFEESHOPMatchDay #CommunitySpirit #FootballSeason

[⚽ Learn More & Join the Celebration ⚽] [#]

EXAMPLE TRANSCREATED ADVERTISEMENT
806

⚽ ✨ Celebrate Goals & Lattes with COFFEESHOP! ≫ ⚽

Hey, football enthusiasts and coffee aficionados! The season of goals has arrived, and there's no better way to savour it than with your favourite COFFEESHOP brew. Immerse yourself in the spirit of Premier League football with our exclusive "Goals & Lattes" campaign, a perfect fusion of the game's thrill and the cosiness of our coffee. ⚽☕

What's Brewing?
- ⚽ Match Day Specials: Celebrate with our limited-time football-themed beverages and snacks. Every goal scored brings you closer to fantastic deals!
- ☆ Cups of Care Initiative: We're contributing to environmental sustainability with every Premier League goal scored! Join us in supporting this vital cause, one cup at a time!
- 📺 Football TV Favourites Nights & Board Game Cafes: Make COFFEESHOP your match day haven! Relish iconic football matches and organise your board game gatherings with enticing group offers.
- 🎵 Match Day Playlist: Get into the match day spirit with tracks from the UK Top 40 and trending artists, specially curated for you.
- 🎨 Street Art Tours: Discover the fusion of football and British culture through the eyes of local artists displayed in our stores.

Family Outdoor Adventures, Parkrun Events, Coffee & Football Trivia Nights... and so much more await you! Whether you're a passionate football fan, a coffee connoisseur, or seeking a cosy spot to enjoy the game with family and friends, COFFEESHOP is your destination this football season.

🎁 ⚽ Exclusive Merch Alert! Don't miss our limited edition COFFEESHOP x Premier League merchandise line. Show off your fandom with pride!

Join the Festivity!
The "Goals & Lattes" campaign coincides with Premier League season in August and continues through to the final match in May. Be part of a season-long celebration that highlights the essence of British community and spirit.

📍 Find your nearest COFFEESHOP and let's make every match day memorable. Follow us for more updates and surprises throughout the season!

🔔 Turn on notifications for our page to stay updated on special offers, events, and more.

GoalsAndLattes #COFFEESHOPMatchDay #CommunitySpirit #FootballSeason

[⚽ Learn More & Join the Celebration ⚽]

Figure 8B:
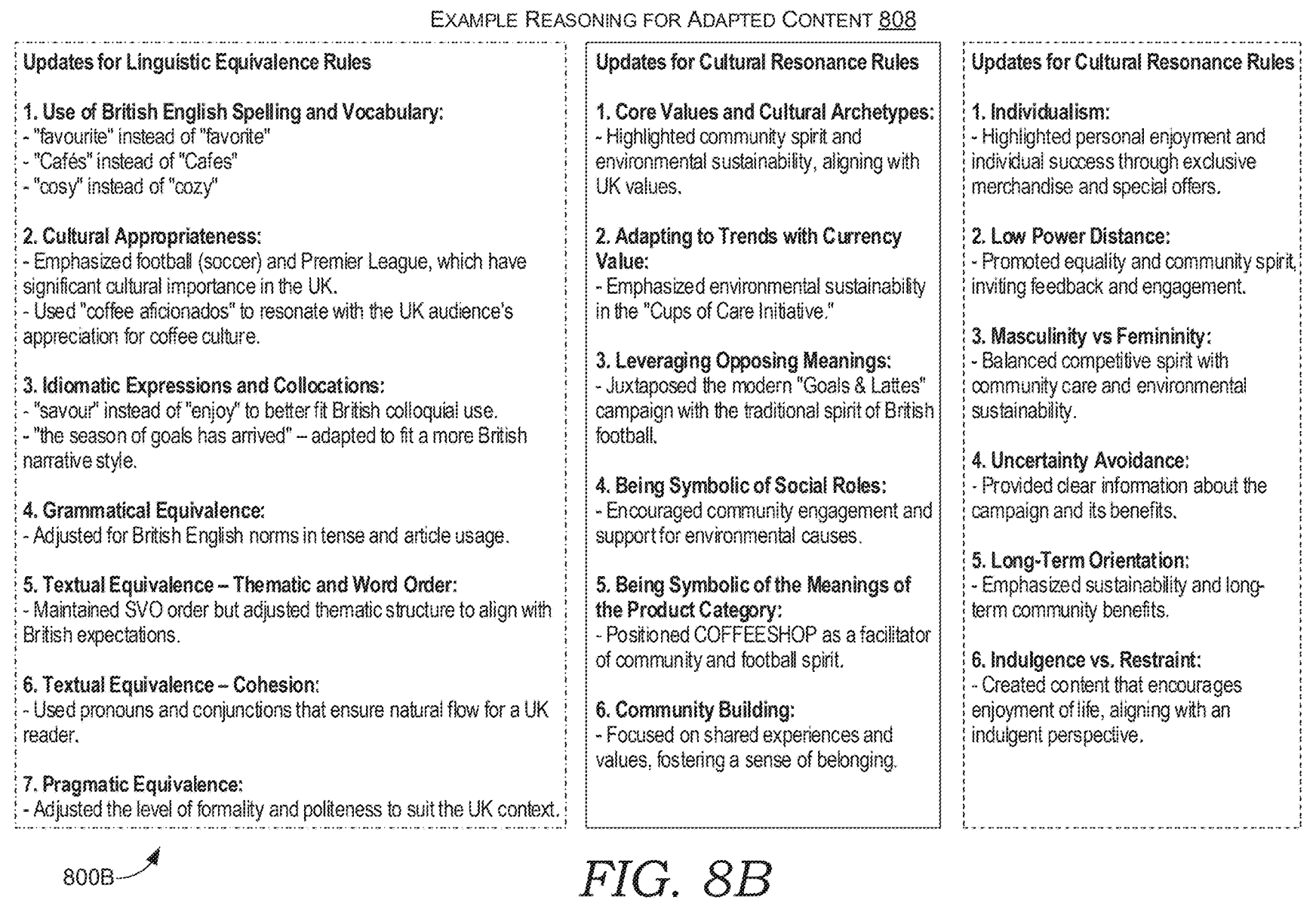

EXAMPLE REASONING FOR ADAPTED CONTENT 808

Updates for Linguistic Equivalence Rules

1. Use of British English Spelling and Vocabulary:
- "favourite" instead of "favorite"
- "Cafés" instead of "Cafes"
- "cosy" instead of "cozy"

2. Cultural Appropriateness:
- Emphasized football (soccer) and Premier League, which have significant cultural importance in the UK.
- Used "coffee aficionados" to resonate with the UK audience's appreciation for coffee culture.

3. Idiomatic Expressions and Collocations:
- "savour" instead of "enjoy" to better fit British colloquial use.
- "the season of goals has arrived" -- adapted to fit a more British narrative style.

4. Grammatical Equivalence:
- Adjusted for British English norms in tense and article usage.

5. Textual Equivalence – Thematic and Word Order:
- Maintained SVO order but adjusted thematic structure to align with British expectations.

6. Textual Equivalence – Cohesion:
- Used pronouns and conjunctions that ensure natural flow for a UK reader.

7. Pragmatic Equivalence:
- Adjusted the level of formality and politeness to suit the UK context.

Updates for Cultural Resonance Rules

1. Core Values and Cultural Archetypes:
- Highlighted community spirit and environmental sustainability, aligning with UK values.

2. Adapting to Trends with Currency Value:
- Emphasized environmental sustainability in the "Cups of Care Initiative."

3. Leveraging Opposing Meanings:
- Juxtaposed the modern "Goals & Lattes" campaign with the traditional spirit of British football.

4. Being Symbolic of Social Roles:
- Encouraged community engagement and support for environmental causes.

5. Being Symbolic of the Meanings of the Product Category:
- Positioned COFFEESHOP as a facilitator of community and football spirit.

6. Community Building:
- Focused on shared experiences and values, fostering a sense of belonging.

Updates for Cultural Resonance Rules

1. Individualism:
- Highlighted personal enjoyment and individual success through exclusive merchandise and special offers.

2. Low Power Distance:
- Promoted equality and community spirit, inviting feedback and engagement.

3. Masculinity vs Femininity:
- Balanced competitive spirit with community care and environmental sustainability.

4. Uncertainty Avoidance:
- Provided clear information about the campaign and its benefits.

5. Long-Term Orientation:
- Emphasized sustainability and long-term community benefits.

6. Indulgence vs. Restraint:
- Created content that encourages enjoyment of life, aligning with an indulgent perspective.

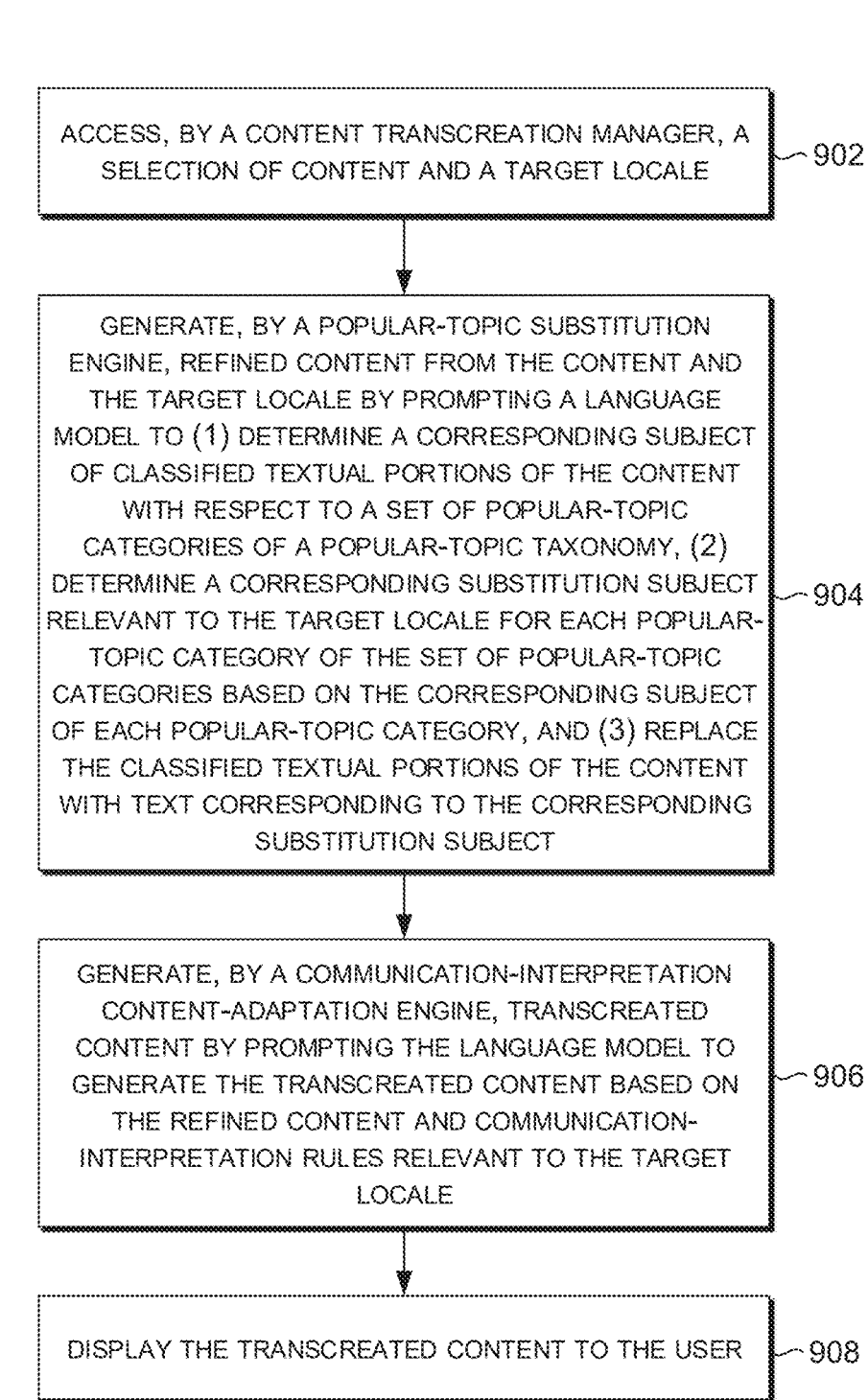

ACCESS, BY A CONTENT TRANSCREATION MANAGER, A SELECTION OF CONTENT AND A TARGET LOCALE 902

GENERATE, BY A POPULAR-TOPIC SUBSTITUTION ENGINE, REFINED CONTENT FROM THE CONTENT AND THE TARGET LOCALE BY PROMPTING A LANGUAGE MODEL TO (1) DETERMINE A CORRESPONDING SUBJECT OF CLASSIFIED TEXTUAL PORTIONS OF THE CONTENT WITH RESPECT TO A SET OF POPULAR-TOPIC CATEGORIES OF A POPULAR-TOPIC TAXONOMY, (2) DETERMINE A CORRESPONDING SUBSTITUTION SUBJECT RELEVANT TO THE TARGET LOCALE FOR EACH POPULAR-TOPIC CATEGORY OF THE SET OF POPULAR-TOPIC CATEGORIES BASED ON THE CORRESPONDING SUBJECT OF EACH POPULAR-TOPIC CATEGORY, AND (3) REPLACE THE CLASSIFIED TEXTUAL PORTIONS OF THE CONTENT WITH TEXT CORRESPONDING TO THE CORRESPONDING SUBSTITUTION SUBJECT 904

GENERATE, BY A COMMUNICATION-INTERPRETATION CONTENT-ADAPTATION ENGINE, TRANSCREATED CONTENT BY PROMPTING THE LANGUAGE MODEL TO GENERATE THE TRANSCREATED CONTENT BASED ON THE REFINED CONTENT AND COMMUNICATION-INTERPRETATION RULES RELEVANT TO THE TARGET LOCALE 906

DISPLAY THE TRANSCREATED CONTENT TO THE USER 908

*FIG. 9*

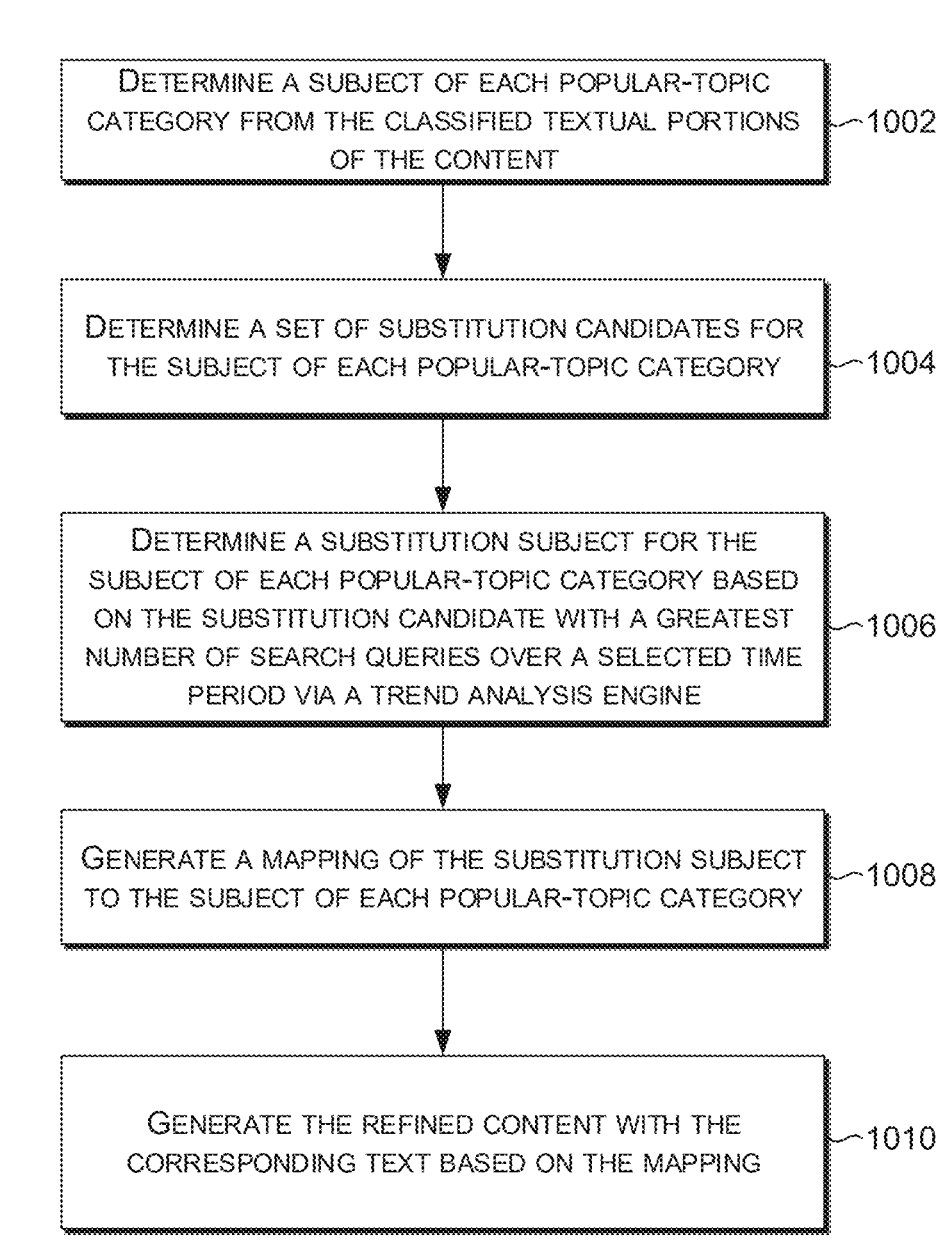

1000

DETERMINE A SUBJECT OF EACH POPULAR-TOPIC CATEGORY FROM THE CLASSIFIED TEXTUAL PORTIONS OF THE CONTENT ⌐1002

DETERMINE A SET OF SUBSTITUTION CANDIDATES FOR THE SUBJECT OF EACH POPULAR-TOPIC CATEGORY ⌐1004

DETERMINE A SUBSTITUTION SUBJECT FOR THE SUBJECT OF EACH POPULAR-TOPIC CATEGORY BASED ON THE SUBSTITUTION CANDIDATE WITH A GREATEST NUMBER OF SEARCH QUERIES OVER A SELECTED TIME PERIOD VIA A TREND ANALYSIS ENGINE ⌐1006

GENERATE A MAPPING OF THE SUBSTITUTION SUBJECT TO THE SUBJECT OF EACH POPULAR-TOPIC CATEGORY ⌐1008

GENERATE THE REFINED CONTENT WITH THE CORRESPONDING TEXT BASED ON THE MAPPING ⌐1010

*FIG. 10*

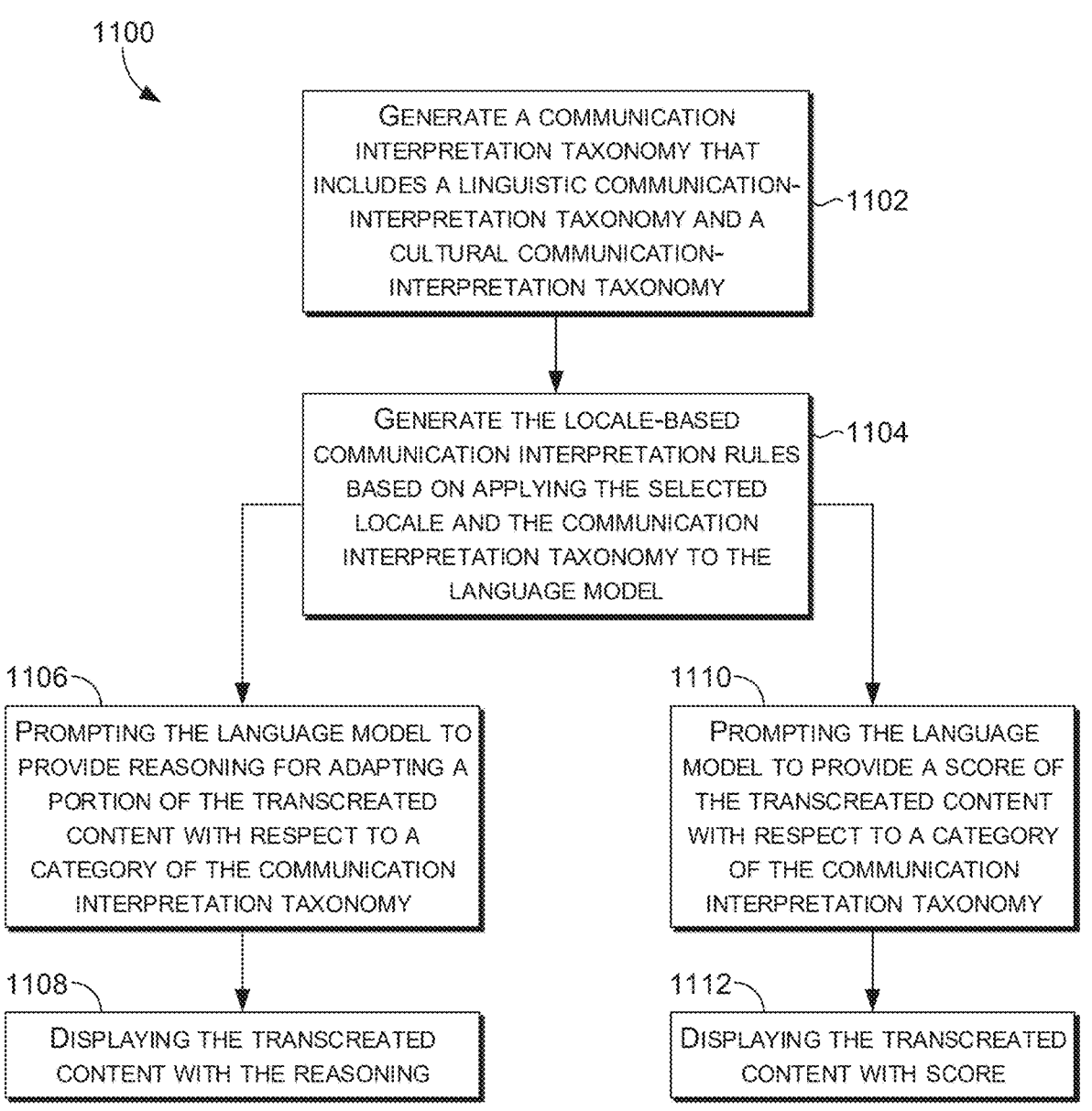

1100

GENERATE A COMMUNICATION INTERPRETATION TAXONOMY THAT INCLUDES A LINGUISTIC COMMUNICATION-INTERPRETATION TAXONOMY AND A CULTURAL COMMUNICATION-INTERPRETATION TAXONOMY — 1102

GENERATE THE LOCALE-BASED COMMUNICATION INTERPRETATION RULES BASED ON APPLYING THE SELECTED LOCALE AND THE COMMUNICATION INTERPRETATION TAXONOMY TO THE LANGUAGE MODEL — 1104

1106 — PROMPTING THE LANGUAGE MODEL TO PROVIDE REASONING FOR ADAPTING A PORTION OF THE TRANSCREATED CONTENT WITH RESPECT TO A CATEGORY OF THE COMMUNICATION INTERPRETATION TAXONOMY

1108 — DISPLAYING THE TRANSCREATED CONTENT WITH THE REASONING

1110 — PROMPTING THE LANGUAGE MODEL TO PROVIDE A SCORE OF THE TRANSCREATED CONTENT WITH RESPECT TO A CATEGORY OF THE COMMUNICATION INTERPRETATION TAXONOMY

1112 — DISPLAYING THE TRANSCREATED CONTENT WITH SCORE

MEMORY

1212

PROCESSOR(S)

1214

PRESENTATION
COMPONENT(S)

1216

RADIO(S)

1224

I/O PORT(S)

1218

I/O COMPONENTS

1220

POWER SUPPLY

1222

1210

TRANSCREATION OF TEXTUAL CONTENT USING A LANGUAGE MODEL

BACKGROUND

Transcreation refers to the process of adapting content from one language to another while preserving the underlying meaning, such as the intent, style, tone, and context, of the content. Marketing departments utilize transcreation to ensure effective global communication by culturally resonating the brand's message across diverse audiences for a unique local customer experience while maintaining brand consistency. Unlike translation, transcreation requires a copywriter to creatively re-write the content to culturally adapt the content for a target audience to ensure the underlying meaning of the content evokes the same emotions and implications as the content evokes for the source audience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, transcreation of textual content using a language model. For example, content, such as an advertisement written for a source locale, and a target locale are input by a user for transcreation of the content with respect to the target locale. After classifying textual portions of the content into popular-topic categories of a popular-topic taxonomy, a prompt is applied to the language model to refine the content by substituting the classified textual portions of the content with substituted text from the popular-topic category that is relevant to the target locale. A subsequent prompt is applied to a language model to generate transcreated content by applying communication-interpretation rules relevant to the target locale to the refined content. The transcreated content generated by the language model is then displayed to the user. By substituting text from the popular-topic category that is relevant to the target locale before prompting the language model to apply the communication-interpretation rules relevant to the target locale to generate the transcreated content, the accuracy of the transcreated content is increased, thereby increasing the cultural and linguistic resonation of the message of the original content to the target locale while preserving the underlying meaning of the original content.

BRIEF DESCRIPTION OF THE DRAWINGS

FIG. 1 depicts a diagram of an environment in which one or more embodiments of the present disclosure can be practiced, in accordance with various embodiments of the present disclosure.

FIG. 4 provides an example diagram of an example popular-topic taxonomy for facilitating transcreation of textual content using a language model, in accordance with embodiments of the present disclosure.

FIG. 5 provides an example diagram of an example communication-interpretation taxonomy for facilitating transcreation of textual content using a language model, in accordance with embodiments of the present disclosure.

FIG. 7 provides an example diagram of an example advertisement for a source locale and an example refined advertisement after facilitating popular-topic substitution for a target locale, in accordance with embodiments of the present disclosure.

FIG. 8A provides an example diagram of an example refined advertisement after facilitating popular-topic substitution for a target locale and an example transcreated advisement after facilitating communication-interpretation content-adaptation, in accordance with embodiments of the present disclosure.

FIG. 8B provides an example diagram of an example reasoning for the adapted content in the example transcreated advisement after facilitating communication-interpretation content-adaptation of FIG. 8A, in accordance with embodiments of the present disclosure.

FIG. 9 is a process flow showing a method for facilitating transcreation of textual content using a language model, in accordance with embodiments of the present disclosure.

FIG. 10 is a process flow showing a method for facilitating popular-topic substitution for a target locale, in accordance with embodiments of the present disclosure.

FIG. 11 is a process flow showing a method for facilitating communication-interpretation content-adaptation, in accordance with embodiments of the present disclosure.

DETAILED DESCRIPTION

Definitions

Figure 2:
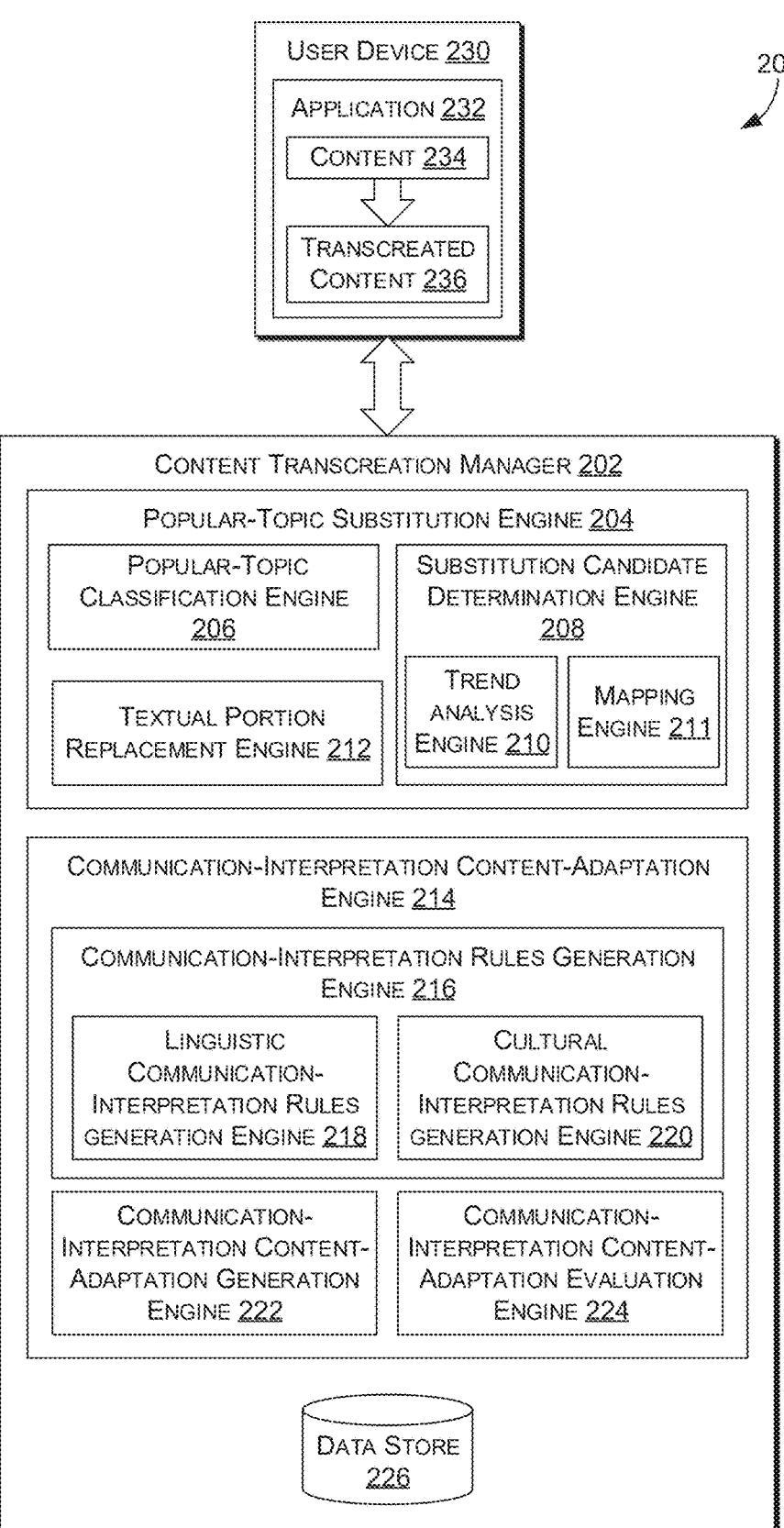
FIG. 2 depicts an example configuration of an operating environment in which some implementations of the present disclosure can be employed, in accordance with various embodiments of the present disclosure.

Various terms are used throughout the description of embodiments provided herein. A brief overview of such terms and phrases is provided here for ease of understanding, but more details of these terms and phrases is provided throughout.

A "language model," such as a large-language model (LLM), generally refers to an artificial intelligence (AI) system trained to understand and generate content, such as human-readable text and/or other multimedia, such as images, based on an input prompt.

A "locale" generally refers to a specific region and/or group of people defined by the unique cultural and/or linguistic nuances of the region and/or group of people. For example, a locale may refer to a country, such as the United States of America (USA) or United Kingdom (UK) or smaller regions within a country, such as a city. The cultural nuances for interpreting communications for a given locale can be determined based on cultural equivalence dimensions, cultural resonance dimensions, and/or the like and/or combinations thereof. The linguistic nuances for interpreting communications for a given locale can be determined based on linguistic equivalence dimensions.

"Cultural equivalence dimensions" generally refer to dimensions that describe the effects of culture on the values and behaviors of the members of a given locale. Examples of cultural equivalence dimensions can include: (1) "power distance" that describes the extent to which less powerful members of a society accept and expect unequal power distribution where high power distance cultures tend to accept hierarchical order, while low power distance cultures prefer equality and shared power; (2) "individualism vs. collectivism" that describes whether people in a society prioritize individual achievements and rights (individualism) or group harmony and collective well-being (collectivism); (3) "masculinity vs. femininity" that describes whether a culture values traditionally masculine traits like competitiveness and assertiveness (masculinity) or traditionally feminine traits like cooperation and care for others (femininity); (4) "uncertainty avoidance" that describes the level of comfort a society has with ambiguity and uncertainty where cultures with high uncertainty avoidance prefer clear rules and structured environments, while those with low uncertainty avoidance are more comfortable with flexibility and change; (5) "long-term vs. short-term orientation" that describes whether a culture focuses on future rewards, perseverance, and thrift (long-term orientation) or emphasizes respect for tradition and immediate social obligations (short-term orientation); (6) "indulgence vs. restraint" that describes the degree to which a society allows or controls the gratification of desires where indulgent cultures encourage people to enjoy life and have fun, while restrained cultures regulate gratification through strict social norms; and/or the like and/or combinations thereof.

"Cultural resonance dimensions" generally refer to dimensions that describe the cultural elements, such as the values, beliefs, and/or experiences, that tend to resonate with a given locale, such as by having an emotional impact on members of a given locale. Culture resonance dimensions can include (1) a description of the culture, such as core values of the culture, (2) a description of the history of the culture, such as cultural archetypes, historical moments, and/or the like; (2) a description of the contemporary trends or "currency value" of the culture; (3) a description of opposing meanings within the culture, such as description of traditional versus modern elements of the culture; (4) a description of social roles within the culture, such as a description that the culture tends to highlight health workers as heroes; (5) a description of the meanings of the product category within the culture, such as a description that the culture is known for excellence and luxury for a specific product category; (6) a description regarding how to appeal to diverse groups, such as a description different generations and/or varied interests of the culture; (7) a description how the culture encourages community building, and/or the like and/or combinations thereof.

"Linguistic equivalence dimensions" generally refer to dimensions that describe the unique requirements of a target language or dialect. Linguistic equivalence dimensions can include: (1) "equivalence at word level" that describes the unique requirements of the target language or dialect regarding the translation of individual words and their meanings; (2) "equivalence above word level" that describes the unique requirements of the target language or dialect regarding how words combine in fixed expressions and phrases; (3) "grammatical equivalence" that describes the unique requirements of the target language or dialect regarding how grammar structures differ; (4) "thematic textual equivalence" that describes the unique requirements of the target language or dialect regarding the coherence of the entire communication with respect to the thematic structure of the communication; (5) "word order textual equivalence" that describes the unique requirements of the target language or dialect regarding how portions of a communication are typically arranged, such as with the order of a subject, verb and object of a sentence; (6) "cohesion textual equivalence" that describes the unique requirements of the target language or dialect regarding the cohesion of the entire communication; (7) "pragmatic equivalence" that describes the unique requirements of the target language or dialect regarding the intent and impact of the communication, such as requirements for politeness, and/or the like and/or combinations thereof.

A taxonomy generally refers to a structured classification system to classify concepts into hierarchical categories based on characteristics of the concept. In this regard, a "popular-topic taxonomy" refers to a set of categories, referred to herein as "popular-topic categories" that can be used to classify content from a given locale within a corresponding popular-topic. For example, an advertisement from the United States might include a reference to the National Football League (NFL), which would be classified in a "sports" popular-topic category. The popular-topic taxonomy can include popular-topic categories, such as sports, music, film, television (tv) and videos, celebrity and popular culture (pop culture), diaries and daily, art and culture, science and technology, fitness and health, family and relationships, business and entrepreneurs, hobbies, gaming, learning and education, food and dining, travel and adventure, youth and student life, fashion and style, news and social concerns, and/or the like and/or combinations thereof.

A "communication-interpretation taxonomy" refers to a set of categories, referred to herein as "communication-interpretation categories" that can be used to classify the cultural and/or linguistic nuances for interpreting communications for a given locale. The communication-interpretation taxonomy can include communication-interpretation categories, such as categories directed to cultural equivalence dimensions, cultural resonance dimensions, linguistic equivalence dimensions, and/or the like. In this regard, the communication-interpretation taxonomy can include (1) a "linguistic communication-interpretation taxonomy" with "linguistic communication-interpretation categories" (e.g., linguistic equivalence dimensions) that can be used to classify the linguistic nuances for interpreting communications and/or (2) a "cultural communication-interpretation taxonomy" with "cultural communication-interpretation categories" (e.g., cultural equivalence dimensions and/or cultural resonance dimensions) that can be used to classify the cultural nuances for interpreting communications.

The communication-interpretation categories can be used to generate rules (e.g., by a language model), referred to herein as "communication-interpretation rules" describing the cultural and/or linguistic nuances for interpreting communications for a given locale. In certain embodiments, the linguistic communication-interpretation categories can be used to generate "linguistic communication-interpretation rules" (e.g., by a language model) describing the linguistic nuances for interpreting communications for a given locale. For example, for an "equivalence at word level" category for the UK, a rule can be generated by a language model indicating the use British English spelling, such as "colour" instead of "color." In certain embodiments, the cultural communication-interpretation categories can be used to generate "cultural communication-interpretation rules" describing the cultural nuances for interpreting communications for a given locale. For example, for an "individualism" category for the UK, a rule can be generated by a language model indicating to emphasize personal achievement and individual rights.

A "trend analysis engine" generally refers to a tool that analyzes the popularity of search queries across different regions and languages over time, such as Google® Trends. In certain embodiments, the trend analysis engine can be accessed via an application programming interface (API).

Overview

As discussed above, marketing departments utilize transcreation to ensure effective global communication by culturally resonating the brand's message across diverse audiences for a unique local customer experience while maintaining brand consistency. By culturally resonating the brand's message across diverse audiences, transcreation increases customer engagement and increases conversion rates across the diverse audience.

However, currently, transcreation requires an individual, such as a copywriter, to creatively re-write the content to culturally and linguistically adapt the content for a target audience of a target locale to ensure the underlying meaning of the content evokes the same emotions and implications as the content evokes for the source audience of the source locale. In this regard, the copyrighter must be well-versed in the requirements of both the source locale and the target locale to effectively transcreate the content.

Accordingly, unnecessary computing resources are utilized for individuals to manually transcreate content from a source locale to a target locale, or multiple target locales, in conventional implementations. For example, computing and network resources are unnecessarily consumed to facilitate manual editing of content from a source locale to transcreate the content for a target locale or multiple target locales. For instance, computer input/output operations are unnecessarily increased in order for each individual to transcreate the content for a target locale as each manual editing operation performed by the individual increases the number of input/output operations. In examples where the content is manually transcreated from a source locale to multiple target locales, the number of individuals required to perform the manual transcreating of the content is often increased as each individual may only be proficient with transcreating content from a source locale to a single target locale. As such, the number of manual editing operations and the complexity of the transcreation process is significantly increased. Further, when information related to editing the content is located in a disk array, there is unnecessary wear placed on the read/write head of the disk of the disk array to manually transcreate the content for a target locale or multiple target locales. Even further, when information related to editing the content is located over a network, the processing of operations to manually transcreate the content for a target locale or multiple target locales decreases the throughput for a network, increases the network latency, and increases packet generation costs.

As such, embodiments of the present disclosure are directed to transcreation of textual content using a language model in an efficient and effective manner. In this regard, a language model can be prompted to generate transcreated content for a target locale from source content by (1) substituting text of the original content classified in a popular-topic category with corresponding text relevant to the target locale and (2) prompting the language model to generate transcreated content by applying communication-interpretation rules relevant to the target locale to the refined content.

Generally, and at a high level, embodiments described herein facilitate transcreation of textual content using a language model. For example, content, such as an advertisement written for a source locale, and a target locale are input by a user for transcreation of the content with respect to the target locale. After classifying textual portions of the content into popular-topic categories of a popular-topic taxonomy, a prompt is applied to the language model to refine the content by substituting the classified textual portions of the content with substituted text from the popular-topic category that is relevant to the target locale. A subsequent prompt is applied to a language model to generate transcreated content by applying communication-interpretation rules relevant to the target locale to the refined content. The transcreated content generated by the language model is then displayed to the user. By substituting text from the popular-topic category that is relevant to the target locale before prompting the language model to apply the communication-interpretation rules relevant to the target locale to generate the transcreated content, the accuracy of the transcreated content is increased, thereby increasing the cultural and linguistic resonation of the message of the original content to the target locale while preserving the underlying meaning of the original content.

In operation, a user, such as a marketer that is creating marketing content on behalf of a business, inputs content, such an advertisement written for a source local, that the user desires to transcreate for a target locale. An example of content from a source locale that is used generate transcreated content for a target locale is shown in example 106 of FIG. 1. As can be understood, an advertisement was written by a marketing content creator for the source locale corresponding to the US and the generated content is transcreated to the target locale corresponding to the UK.

The content is refined to generate refined content by a popular-topic substitution engine by substituting the classified text of the content with substituted text from the popular-topic category that is relevant to the target locale. In certain embodiments, representations of textual portions of the content are classified into popular-topic categories of a popular-topic taxonomy by a popular-topic classification engine. For example, an advertisement from the United States might include a textual portion corresponding to the word "touchdown," which would be classified in a "sports" popular-topic category.

In certain embodiments, the popular-topic classification engine classifies representations of textual portions from the content into popular-topic categories by applying a prompt to a language model with the content, the popular-topic taxonomy, and instructions to classify textual portions of the content into popular-topic categories of the popular-topic taxonomy. An example of text from an example advertisement classified into popular-topic categories is shown in FIG. 7. As can be understood, the terms "touchdowns," "game day," "NFL touchdown", "Super Bowl," "#TouchdownsAndLattes," #COFFEESHOPGameDay" are classified into a "sports" category. Similarly, other terms are classified into different categories, such as the term "half-time playlist" being classified in the "music category," and the term "local artist showcase" being classified in the "arts & culture" category.

In certain embodiments, for each of the popular-topic categories of the classified textual portions of the content, a representation of a subject (e.g., a concept) of the classified textual portions of the content in the corresponding popular-topic category is determined by the popular-topic classification engine. For example, an advertisement from the United States might include textual portions corresponding to the words "touchdowns" and "Super Bowl," which are both classified in a "sports" popular-topic category. In this example, the representation of the subject of the "sports"

popular-topic category corresponding to the words "touchdowns" and "Super Bowl" can be determined to be the term "NFL." The process is repeated for each popular-topic category identified in the advertisement to determine a representation of a subject of each popular-topic category. In certain embodiments, the popular-topic classification engine determines the representation of the subject of each of the popular-topic categories identified in the content by applying a prompt to a language model that includes instructions to determine a subject of the classified textual portions of the content for each of the popular-topic categories.

In certain embodiments, for each of the popular-topic categories of the classified textual portions of the content, a set of substitution candidates relevant to the target locale are determined by a substitute candidate determination engine based on the corresponding representation of the subject of the classified textual portions of the content of the popular-topic category. For example, a set of substitution candidates relevant to the "UK" target locale that correspond to the "NFL" subject of the "sports" popular-topic category can be determined to be "[Premiere league, Wimbledon, Rugby Union, Cricket, and Formula 1]." In certain embodiments, the substitution candidate determination engine determines substitution candidates relevant to the target locale for each of the popular-topic categories by applying a prompt to a language model with the popular-topic taxonomy (e.g. or a portion thereof corresponding to the popular-topic categories identified in the content), the subjects (e.g., concepts) of the popular-topic categories identified in the content, and instructions to determine substitution candidates relevant to the target locale for each of the subjects of the popular-topic categories.

In certain embodiments, a selected substitution candidate relevant to the target locale is determined for each of the popular-topic categories of the classified textual portions of the contents by the substitution candidate determination engine. For example, based on the set of substitution candidates relevant to the "UK" target locale of "[Premiere league, Wimbledon, Rugby Union, Cricket, and Formula 1]," the selected substitution candidate can be determined to be "Premiere league." In certain embodiments, the substitution candidate determination engine determines the selected substitution candidate by applying a prompt to a language model with each of the sets of substitution candidates relevant to the target locale for each of the popular-topic categories (e.g., as output previously by the language model) and instructions to determine the substitution candidate with the greatest number of search queries in the target locale over a selected period of time via an API to the trend analysis engine.

In certain embodiments, the substitution candidate determination engine generates a mapping via a mapping engine that maps each representation of the subjects of each of the popular-topic categories to a corresponding selected substitution candidate relevant to the target locale. For example, the mapping engine can generate the mapping by applying a prompt to a language model that includes instructions to map each representation of the subjects of each of the popular-topic categories to a corresponding selected substitution candidate relevant to the target locale.

In certain embodiments, the refined content is generated by replacing each classified textual portion of the content with a corresponding substituted textual portion based on the corresponding selected substitution candidate relevant to the target locale by a textual portion replacement engine. For example, for the selected substitution candidate of "Premiere league," the words "touchdowns" and "Super Bowl"

corresponding to the subject "NFL" can be changed to "goals" and "final match," respectively. In certain embodiments, the textual portion replacement engine generates the refined content by replacing each classified textual portion of the content with a corresponding substituted textual portion relevant to the target locale by applying a prompt to a language model with the content, the classified textual portions of the content, the mapping that maps each representation of the subjects of each of the popular-topic categories to a corresponding selected substitution candidate relevant to the target locale, and instructions to replace each classified textual portion of the content with a corresponding substituted textual portion based on the corresponding selected substitution candidate relevant to the target locale from the mapping.

Transcreated content is generated by a communication-interpretation content-adaptation engine by applying communication-interpretation rules relevant to the target locale to the refined content. In certain embodiments, the communication-interpretation rules relevant to the target locale are generated by a communication-interpretation rules generation engine using a communication-interpretation taxonomy with communication-interpretation categories. An example of a communication-interpretation taxonomy is shown in FIG. 5. In certain embodiments, the communication-interpretation rules generation engine generates communication-interpretation rules relevant to the target locale by applying a prompt to a language model with the communication-interpretation taxonomy and instructions to generate rules relevant to the target locale for each of the communication-interpretation categories of the communication-interpretation taxonomy.

In certain embodiments, a communication-interpretation content-adaptation generation engine generates the transcreated content by applying a prompt to a language model with the refined content, communication-interpretation rules relevant to the target locale, and instructions to generate the transcreated content. In certain embodiments, communication-interpretation content-adaptation generation engine includes instructions in the prompt to the language model to identify each of the changes made to the refined content in generating the transcreated content with respect to the communication-interpretation rules relevant to the target locale. An example of transcreated content and the identified changes with respect to communication-interpretation rules is shown in FIG. 8A.

In certain embodiments, the communication-interpretation content-adaptation generation engine and/or a communication-interpretation content-adaptation evaluation engine generates an evaluation of the transcreated content with respect to communication-interpretation categories of the communication-interpretation taxonomy. For example, the communication-interpretation content-adaptation generation engine and/or the communication-interpretation content-adaptation evaluation engine generates the evaluation of the transcreated content by applying a prompt to a language model with instructions to generate the evaluation with respect to the communication-interpretation categories.

In some embodiments, the communication-interpretation content-adaptation generation engine generates the evaluation by including reasoning behind changes to the refined content in generating the transcreated content with respect to the communication-interpretation categories. An example of reasoning behind changes to the refined content in generating the transcreated content with respect to communication-interpretation categories is shown in FIG. 8B. As can be understood, the reasoning behind each of the adaptations of the refined content in generating the transcreated content is provided with respect to each of the communication-interpretation categories. In certain embodiments, by instructing a language model to include reasoning for changes to the refined content in generating the transcreated content, hallucinations by the language model can be reduced.

In some embodiments, the communication-interpretation content-adaptation evaluation engine generates the evaluation by including scores of the transcreated content with respect to communication-interpretation categories of the communication-interpretation taxonomy. In certain embodiments, by instructing a language model to score the transcreated content with respect to communication-interpretation categories, parametrizable metrics can be generated to optimize the language model and/or output from the language model.

The transcreated content and/or evaluation of the transcreated is then displayed to the user for approval and/or further editing of the transcreated content.

Advantageously, efficiencies of computing and network resources can be enhanced using implementations described herein. In particular, the transcreation of textual content using a language model results in a more efficient use of computing resources (e.g., higher throughput and reduced latency for a network, less packet generation costs, etc.) than conventional methods of manually transcreating content from a source locale to a target locale or multiple target locales. For example, the technology described herein enables the efficient and effective transcreation of textual content using a language model, thereby reducing unnecessary computing resources used to process a significant number of manual editing operations to manually transcreate content from a source locale to a target locale or multiple target locales. Further, the technology described herein results in less manual editing operations manually to transcreate content from a source locale to a target locale or multiple target locales over a computer network, which results in higher throughput, reduced latency and less packet generation costs as fewer packets are sent over a network. Therefore, the technology described herein conserves network resources.

Overview of Exemplary Environments of Transcreation of Textual Content Using a Language Model Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 12.

It should be understood that operating environment 100 shown in FIG. 1 is an example of one suitable operating environment. Among other components not shown, operating environment 100 includes a user device 102, network 104, content transcreation manager 108, and language model 112. Operating environment 100 also shows example 106 of transcreation of textual content 106A from a source local (e.g., USA) to transcreated content 106B of a target locale (e.g., UK). Each of the components shown in FIG. 1 can be implemented via any type of computing device, such as one or more of computing device 1200 described in connection to FIG. 12, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a marketer transcreating marketing content, such as advertisements, on behalf of a business and/or any individual transcreating content for a target locale). For example, in some implementations, such devices are the type of computing device described in relation to FIG. 12. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

User device 102 can be a client device on a client-side of operating environment 100, while content transcreation manager 108 can be on a server-side of operating environment 100. Content transcreation manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or content transcreation manager 108 to remain as separate entities.

Application 110 operating on user device 102 can generally be any application capable of facilitating the exchange of information between the user device(s) and the content transcreation manager 108 in transcreating content for a target locale from source content through substituting text of the original content classified in a popular-topic category with corresponding text relevant to the target locale, prompting the language model to generate transcreated content by applying communication-interpretation rules relevant to the target locale to the refined content, and/or generating an evaluation of the transcreated content. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly.

In accordance with embodiments herein, the application 110 can facilitate transcreation of textual content using a language model in an efficient and effective manner. In operation, content, such as example advertisement 106A of example 106, and a target locale (e.g., UK) are input by a user via a user interface of application 110 of device 102 for transcreation of the content with respect to the target locale. After classifying textual portions of the content into popular-topic categories of a popular-topic taxonomy, a prompt is applied to language model 112 by content transcreation manager 108 to refine the content by substituting the classified textual portions of the content with substituted text from the popular-topic category that is relevant to the target locale. A subsequent prompt is applied to language model 112 by content transcreation manager 108 to generate transcreated content by applying communication-interpretation rules relevant to the target locale to the refined content. The transcreated content, such as example transcreated advertisement 106B of example 106, generated by the language model 112 is then displayed to the user via a user interface of application 110 via device 102. In some embodiments, content transcreation manager 108 prompts the language model 112 to generate an evaluation of the transcreated content with respect to the communication-interpretation rules relevant to the target locale, such as reasoning behind changes of the refined content to the transcreated content and/or scoring of the transcreated content with respect to the communication-interpretation rules. The evaluation of the transcreated content can then be displayed to the user via a user interface of application 110 via device 102.

Content transcreation manager 108 can be or include a server, including one or more processors, and one or more computer-readable media. The computer-readable media includes computer-readable instructions executable by the one or more processors. The instructions can optionally implement one or more components of content transcreation manager 108, described in additional detail below with respect to content transcreation manager 202 of FIG. 2.

For cloud-based implementations, the instructions on content transcreation manager 108 can implement one or more components, and application 110 can be utilized by a user to interface with the functionality implemented on content transcreation manager 108. In some cases, application 110 comprises a web browser. In other cases, content transcreation manager 108 may not be required. For example, the components of content transcreation manager

108 may be implemented completely on a user device, such as user device 102. In this case, content transcreation manager 108 may be embodied at least partially by the instructions corresponding to application 110.

Thus, it should be appreciated that content transcreation manager 108 may be provided via multiple devices arranged in a distributed environment that collectively provide the functionality described herein. Additionally, other components not shown may also be included within the distributed environment. In addition, or instead, content transcreation manager 108 can be integrated, at least partially, into a user device, such as user device 102. Furthermore, content transcreation manager 108 may at least partially be embodied as a cloud computing service.

Referring to FIG. 2, aspects of an illustrative content transcreation management system 200 are shown, in accordance with various embodiments of the present disclosure. At a high level, embodiments described herein transcreation of textual content using a language model by substituting text of the original content classified in a popular-topic category with corresponding text relevant to the target locale, prompting the language model to generate transcreated content by applying communication-interpretation rules relevant to the target locale to the refined content, and/or generating an evaluation of the transcreated content As shown in FIG. 2, content transcreation manager 202 includes a popular topic substitution engine 204, a popular-topic classification engine 206, a substitution candidate determination engine 208, a trend analysis engine 210, a mapping engine 211, textual portion replacement engine 212, communication interpretation content-adaptation engine 214, communication-interpretation rules generation engine 216, linguistic communication-interpretation rules generation engine 218, cultural communication-interpretation rules generation engine 220, communication-interpretation content-adaptation generation engine 222, communication-interpretation content-adaptation evaluation engine 224, and data store 226. The foregoing components of content transcreation manager 202 can be implemented, for example, in operating environment 100 of FIG. 1. In particular, those components may be integrated into any suitable combination of user devices 102 and/or content transcreation manager 108.

Data store 226 can store computer instructions (e.g., software program instructions, routines, or services), data, and/or models used in embodiments described herein. In some implementations, data store 226 stores information or data received or generated via the various components of content transcreation manager 202 and provides the various components with access to that information or data, as needed. Data store 226 may be embodied as one or more data stores and the information in data store 226 may be distributed in any suitable manner across one or more data stores for storage (which may be hosted externally).

The popular-topic substitution engine 204 is generally configured to generate refined content by substituting the classified text of the content with substituted text from the popular-topic category that is relevant to the target locale. The popular-topic substitution engine 204, and/or any of its subcomponents, can include rules, conditions, associations, models, algorithms, or the like to generate the refined content. For example, the popular-topic substitution engine 204, and/or any of its subcomponents, may comprise NLP techniques, statistical model, fuzzy logic, neural network, finite state machine, support vector machine, logistic regression, clustering, or machine-learning techniques, similar statistical classification processes, or combinations of these to generate the refined content.

The communication interpretation content-adaptation engine 214 is generally configured to generate transcreated content by applying communication-interpretation rules relevant to the target locale to the refined content. The communication interpretation content-adaptation engine 214, and/or any of its subcomponents, can include rules, conditions, associations, models, algorithms, or the like to generate the transcreated content. For example, the communication interpretation content-adaptation engine 214, and/or any of its subcomponents, may comprise NLP techniques, statistical model, fuzzy logic, neural network, finite state machine, support vector machine, logistic regression, clustering, or machine-learning techniques, similar statistical classification processes, or combinations of these to generate the transcreated content.

Figure 3:
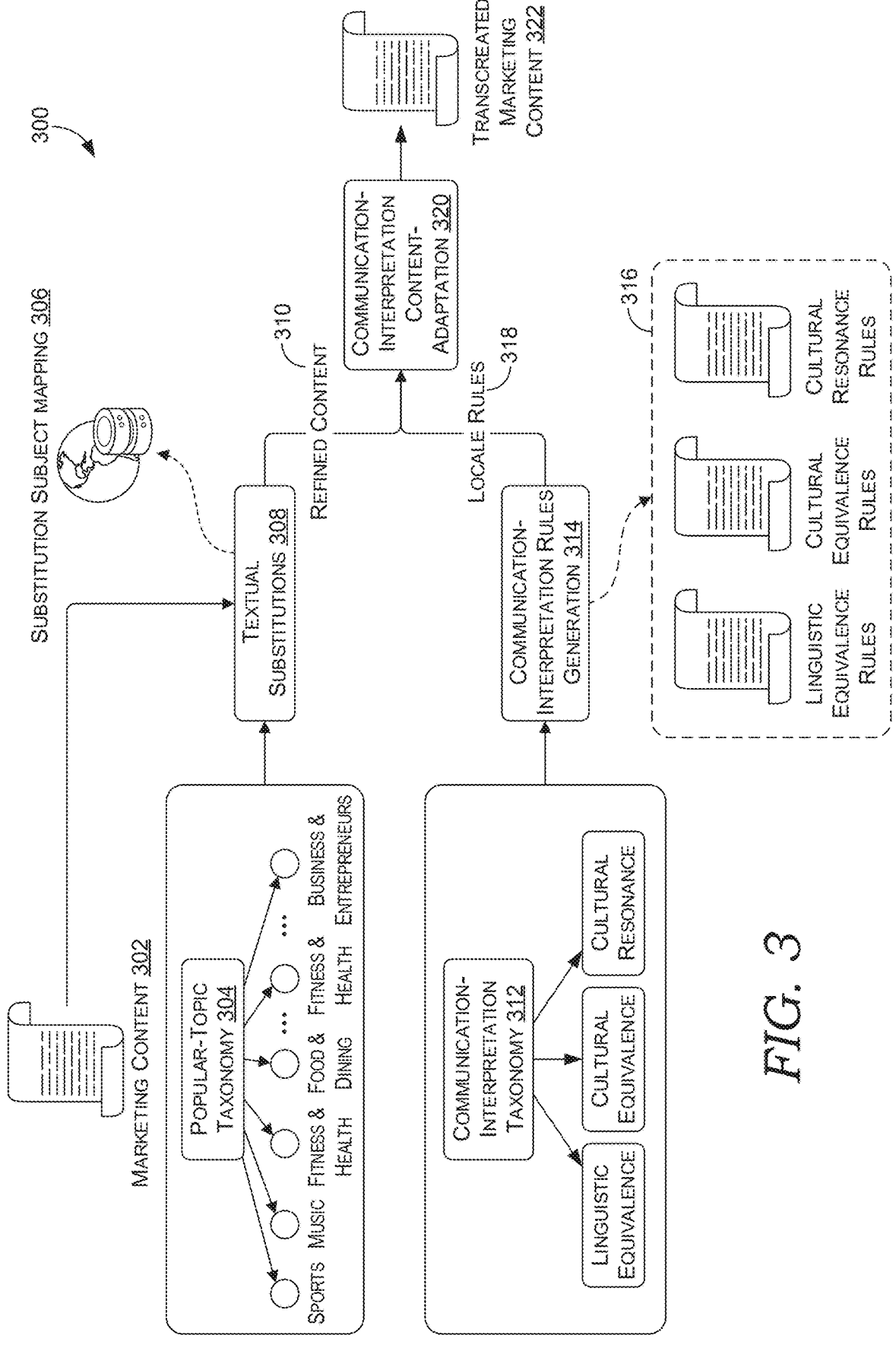
FIG. 3 provides an example diagram of facilitating transcreation of textual content using a language model, in accordance with embodiments of the present disclosure.

Content transcreation manager 202 generates transcreated content using a language model by substituting text of the original content classified in a popular-topic category with corresponding text relevant to the target locale, prompting the language model to generate transcreated content by applying communication-interpretation rules relevant to the target locale to the refined content, and/or generating an evaluation of the transcreated content. At a high level, FIG. 3 provides an example diagram 300 of facilitating transcreation of textual content using a language model, in accordance with embodiments of the present disclosure. As can be understood from diagram 300, marketing content 302 and popular-topic taxonomy 304 are utilized to generate a substitution subject mapping 306 from textual portions of the marketing content that are classified into categories of the popular-topic taxonomy 304. Textual substitutions 308 are determined for each of the classified textual portions of the marketing content 302 based on the substitution subject mapping. Refined content 310 (e.g., intermediate content) is then generated by a language model by substituting the textual substitutions 308 for each of the classified textual portions of the marketing content. Communication-interpretation rules 316 are generated via communication-interpretation rules generation 314 based on a communication-interpretation taxonomy 312. The communication rules relevant to the selected locale, referred to as local rules 318, are then applied to the refined content 310 via communication-interpretation content-adaptation 320 to generate the transcreated marketing content 322.

Returning to FIG. 2, in certain embodiments, a user, such as a marketer that is creating marketing content on behalf of a business, inputs content 234, such an advertisement written for a source local, that the user desires to transcreate for a target locale via a user interface of application 232 (e.g., application 110 of FIG. 1) on user device 230 (e.g., user device 102 of FIG. 1). Content transcreation manager 202 outputs transcreated content 236 for display to the user via a user interface of application 232 on user device 230. An example of content from a source locale that is used generate transcreated content for a target locale is shown in example 106 of FIG. 1. As can be understood, an advertisement (e.g., 106A) was written by a marketing content creator for the source locale corresponding to the US and the generated content is transcreated to the target locale corresponding to the UK (e.g., 106C).

Figure 6:
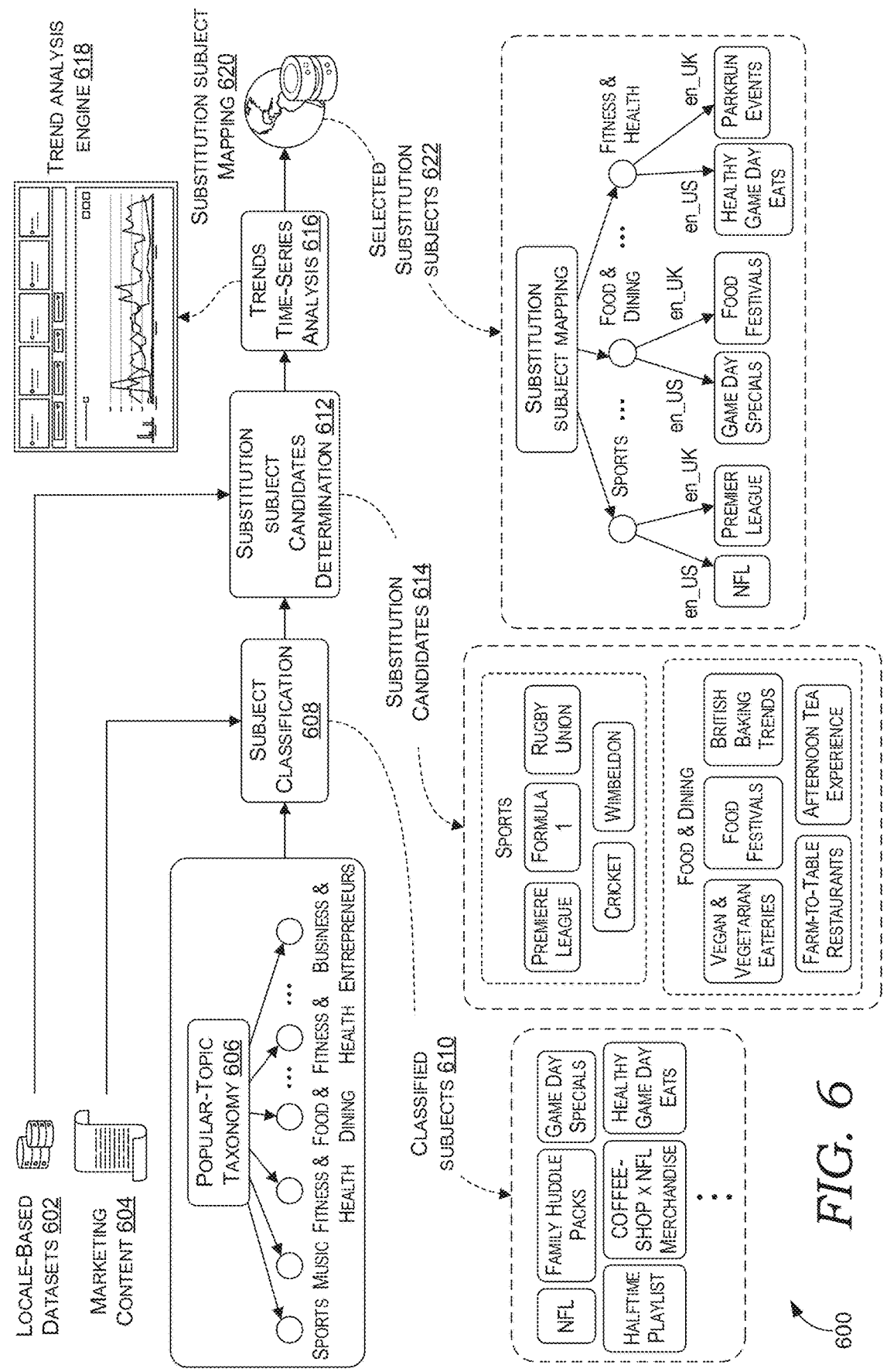
FIG. 6 provides an example diagram of facilitating popular-topic substitution for facilitating transcreation of textual content using a language model, in accordance with embodiments of the present disclosure.

Returning to FIG. 2, the content is refined to generate refined content by a popular-topic substitution engine 204 by substituting the classified text of the content with substituted text from the popular-topic category that is relevant to the target locale. At a high level, FIG. 6 provides an example diagram 600 of facilitating popular-topic substitution for facilitating transcreation of textual content using a language model, in accordance with embodiments of the present disclosure. As can be understood from diagram 600, classified subjects 610 in textual portions of marketing content are determined via subject classification 608 based on textual portions of the marketing content 604 and the popular-topic taxonomy 606. Substitution candidates 614 are determined for a target locale (e.g., UK) via substitution subject candidate determination 612 based on the classified subjects 610. A substitution subject mapping 620 is determined corresponding to the selected substitution subjects 622 between the source locale (e.g., USA) to the target locale (e.g., UK) via a trends time-series analysis 616 with respect to a trend analysis engine 618 to determine the most popular substitution subject.

Returning to FIG. 2, in certain embodiments, representations of textual portions of the content are classified into popular-topic categories of a popular-topic taxonomy by a popular-topic classification engine 206. For example, an advertisement from the United States might include a textual portion corresponding to the word "touchdown," which would be classified in a "sports" popular-topic category. An example of a popular-topic taxonomy is shown in FIG. 4. As can be understood from diagram 400, the popular-topic taxonomy 402 can include popular-topic categories, such as sports, music, film, television (tv) and videos, celebrity and popular culture (pop culture), diaries and daily, art and culture, science and technology, fitness and health, family and relationships, business and entrepreneurs, hobbies, gaming, learning and education, food and dining, travel and adventure, youth and student life, fashion and style, news and social concerns, and/or the like and/or combinations thereof.

An example of a prompt to a language model (e.g., language model 106 of FIG. 1) providing definitions of example popular-topic categories is provided as follows:

---

"topic_definitions = {\n",
    "'news_&_social_concern': 'The exploration and discussion of current events, societal issues, and public affairs that impact communities and the world at large.',\n",
    " 'sports': 'Activities involving physical exertion and skill in which individuals or teams compete against each other for entertainment or as a profession.',\n",
    " 'music': 'The art or science of combining vocal or instrumental sounds (or both) to produce beauty of form, harmony, and expression of emotion.',\n",
    " 'film_tv_&_videos': 'Visual content created for entertainment or informational purposes, including movies, television shows, and online video productions.',n",
    " 'celebrity_&_pop_culture': 'The phenomenon of fame and public attention given to individuals known as celebrities in various fields, and the cultural trends and fads that captivate society.',\n",
    " 'diaries_&_daily': 'Personal records of events, experiences, thoughts, and observations kept on a daily basis, often reflecting the personal life of the author.',\n",
    " 'arts_&_culture': 'The expression of human creativity and imagination, typically in a visual -continued form such as painting or sculpture, and the appreciation of human intellectual
  achievement and heritage.',\n",
" 'science_&_technology': 'The systematic study of the structure and behavior of the physical
  and natural world through observation and experiment, and the application of
  scientific knowledge for practical purposes.',\n",
" 'fitness_&_health': 'Activities and practices that relate to the maintenance and improvement
  of physical well-being through exercise, nutrition, and lifestyle choices.',\n",
" 'business_&_entrepreneurs': 'The activities involved in the production, sale, or distribution
  of goods or services, and individuals who innovate, create, and manage these
  businesses.',\n",
" 'family_&_relationships': 'The social connections and bonds between individuals who may
  or may not be related by blood or marriage, including the dynamics and
  interactions within these groups.',\n",
" 'hobbies': 'Leisure activities that individuals engage in for pleasure and relaxation, not as a
  main occupation.',\n",
" 'gaming': 'The act of playing games, either through physical board games, video games, or
  interactive activities on digital platforms.',\n",
" 'learning_&_education': 'The acquisition of knowledge, skills, values, beliefs, and habits
  through various means such as teaching, training, research, or personal
  study.',\n",
" 'food_&_dining': 'The preparation, consumption, and culture surrounding edible items, and
  the establishments where people gather to eat meals.',\n",
" 'travel_&_adventure': 'The activity of traveling from one place to another, often for leisure,
  exploration, or the experience of new cultures and environments.',\n",
" 'fashion &_style': 'The trends and practices in clothing, accessories, and personal
  appearance that are considered appealing or fashionable at a given time.'\n",
"}"

Returning to FIG. 2, in certain embodiments, the popular-topic classification engine 206 classifies representations of textual portions from the content into popular-topic categories by applying a prompt to a language model (e.g., language model 106 of FIG. 1) with the content, the popular-topic taxonomy, and instructions to classify textual portions of the content into popular-topic categories of the popular-topic taxonomy. An example of text from an example advertisement classified into popular-topic categories is shown in FIG. 7. As can be understood from diagram 700, the terms "touchdowns," "game day," "NFL touchdown", "Super Bowl," "#TouchdownsAndLattes," #COFFEE-SHOPGameDay" from example advertisement 704 are classified into a "sports" category of popular-topic categories 702. Similarly, other terms from example advertisement 704 are classified into different categories of popular-topic categories 702, such as the term "halftime playlist" being classified in the "music category," and the term "local artist showcase" being classified in the "arts & culture" category.

Returning to FIG. 2, alternatively, in some embodiments, the popular-topic classification engine 206 classifies text from the content into popular-topic categories through any known classification model, such as a machine learning model trained to identify and classify content into popular-topic categories.

In certain embodiments, for each of the popular-topic categories of the classified textual portions of the content, a representation of a subject (e.g., a concept) of the classified textual portions of the content in the corresponding popular-topic category is determined by the popular-topic classification engine 206. For example, an advertisement from the United States might include textual portions corresponding to the words "touchdowns" and "Super Bowl," which are both classified in a "sports" popular-topic category. In this example, the representation of the subject of the "sports" popular-topic category corresponding to the words "touchdowns" and "Super Bowl" can be determined to be the term "NFL." The process is repeated for each popular-topic category identified in the advertisement to determine a representation of a subject of each popular-topic category. In certain embodiments, the representation of the subject of a classified textual portion of the content can correspond to text of the classified textual portion of content. For example, the subject of the "arts & culture" popular-topic category corresponding to the term "local artist showcase" can be determined to be the original term "local artist showcase."

In certain embodiments, the popular-topic classification engine 206 determines the representation of the subject of each of the popular-topic categories identified in the content by applying a prompt to a language model that includes instructions to determine a subject of the classified textual portions of the content for each of the popular-topic categories. In certain embodiments, the instructions to determine a subject of the classified textual portions of the content for each of the popular-topic categories are included in the prompt with the instructions to classify textual portions of the content into popular-topic categories of the popular-topic taxonomy.

An example of a prompt to a language model to classify textual portions from the content into popular-topic categories and to determine a subject (e.g., concept) of the classified textual portions of the content for each of the popular-topic categories is provided as follows:

" input_variables= ['locale', 'original_content', 'topics', 'topic_definitions'],\n",
" template= \"\"\"\n",
"As a friendly AI transcreation agent, your task is classify topics and concepts in the original
    content for a given market locale. Topics and concepts are proper nouns.\n",
"\n",
"###LOCALE\n",
"==========================================================\n",
"{locale}\n",

```
"==========================================================\n",
"\n",
"###ORIGINAL CONTENT\n",
"==========================================================\n",
"{original_content}\n",
"==========================================================\n",
"\n",
"### SUBSTITUTION CATEGORIES\n",
"==========================================================\n",
"- news & social concern\n",
"- sports\n",
"- music\n",
"- film tv & videos\n",
"- celebrity & pop culture\n",
"- diaries & daily\n",
"- arts & culture\n",
"- science & technology\n",
"- fitness & health\n",
"- business & entrepreneurs\n",
"- family & relationships\n",
"- hobbies\n",
"- gaming\n",
"- learning & education\n",
"- food & dining\n",
"- travel & adventure\n",
"- youth & student life\n",
"- fashion & style\n",
"==========================================================\n",
"\n",
"### CATEGORY DEFINITIONS\n",
"==========================================================\n",
"{topic_definitions}\n",
"==========================================================\n",
"\n",
"Task Objective:\n",
"\n",
"1. First identify topics and concepts in the original content that can be mapped to the below
        categories.\n",
"2. Concept should be 1-5 words long.\n",
"3. Output the topics and concepts in a json format with categories as key as topics or
        concepts as value. If a value for a category can't be found, set it as N/A.\n",
"""\n",
"{{\n",
"'news_&_social_concern': '<concept>',\n",
"'sports': '<concept>',\n",
"'music': '<concept>',\n",
"'news_&_social_concern': '<concept>',\n",
"'sports': '<concept>',\n",
"'music': '<concept>',\n",
"'film_tv_&_videos': '<concept>',\n",
"'celebrity_&_pop_culture': '<concept>',\n",
"'diaries_&_daily': '<concept>',\n",
"'arts_&_culture': '<concept>',\n",
"'science_&_technology': '<concept>',\n",
"'fitness_&_health': '<concept>',\n",
"'business_&_entrepreneurs': '<concept>',\n",
"'family_&_relationships': '<concept>',\n",
"'hobbies': '<concept>',\n",
"'gaming': '<concept>',\n",
"'learning_&_education': '<concept>',\n",
"'food_&_dining': '<concept>',\n",
"'travel_&_adventure': '<concept>',\n",
"'fashion_&_style': '<concept>',\n",
"}}\n",
```

In certain embodiments, for each of the popular-topic categories of the classified textual portions of the content, a set of substitution candidates relevant to the target locale are determined by a substitute candidate determination engine 208 based on the corresponding representation of the subject of the classified textual portions of the content of the popular-topic category. For example, a set of substitution candidates relevant to the "UK" target locale that correspond to the "NFL" subject of the "sports" popular-topic category can be determined to be "[Premiere league, Wimbledon, Rugby Union, Cricket, and Formula 1]." In certain embodi-ments, the substitution candidate determination engine 208 determines substitution candidates relevant to the target locale for each of the popular-topic categories by applying a prompt to a language model with the popular-topic tax-onomy (e.g. or a portion thereof corresponding to the popular-topic categories identified in the content), the sub-jects (e.g., concepts) of the popular-topic categories identi-fied in the content, and instructions to determine substitution candidates relevant to the target locale for each of the subjects of the popular-topic categories.

An example of a prompt to a language model to determine a set of substitution candidates relevant to the target locale for each of the popular-topic categories is provided as follows:

```
"    input_variables= ['locale', 'original_content', 'topics', 'topic_definitions'],\n",
"    template= \"\"\"\"\"\n",
"As a friendly AI transcreation agent, your task is to reword the below given topics identified
        from the original content based on current trends and the culture of the given
        locale. The goal is to preserve the messaging intent of the original input for the
        given market locale. Topics and concepts should be proper nouns.\n",
"\n",
"###LOCALE\n",
"=========================================================\n",
"{locale}\n",
"=========================================================\n",
"\n",
"###ORIGINAL CONTENT\n",
"=========================================================\n",
"{original_content}\n",
"=========================================================\n",
"\n",
"###TOPICS\n",
"=========================================================\n",
"{topics}\n",
"=========================================================\n",
"\n",
"###TOPIC DEFINITIONS\n",
"=========================================================\n",
"{topic_definitions}\n",
"=========================================================\n",
"\n",
"Task Objective:\n",
"\n",
"1. Identify equivalent/substitute topics and concepts from popular trends in the {locale} in
        a json format.\n",
"2. If the original topic is N/A, set the substitution topic as N/A.\n",
"3. The substitute topics should resonate with the original content.\n",
"4. DO NOT USE cultural stereotypes.\n",
"\"\"\"\n",
"{{\n",
"'news_&_social_concern': '<topic1>, <topic2>, <topic3>, <topic4>, <topic5>',\n",
"'sports': '<topic1>, <topic2>, <topic3>, <topic4>, <topic5>',\n",
"'music': '<topic1>, <topic2>, <topic3>, <topic4>, <topic5>',\n",
"'news_&_social_concern': '<topic1>, <topic2>, <topic3>, <topic4>, <topic5>',\n",
"'sports': '<topic1>, <topic2>, <topic3>, <topic4>, <topic5>',\n",
"'music': '<topic1>, <topic2>, <topic3>, <topic4>, <topic5>',\n",
"'film_tv_&_videos': '<topic1>, <topic2>, <topic3>, <topic4>, <topic5>',\n",
"'celebrity_&_pop_culture': '<topic1>, <topic2>, <topic3>, <topic4>, <topic5>',\n",
"'diaries_&_daily': '<topic1>, <topic2>, <topic3>, <topic4>, <topic5>',\n",
"'arts_&_culture': '<topic1>, <topic2>, <topic3>, <topic4>, <topic5>',\n",
"'science_&_technology': '<topic1>, <topic2>, <topic3>, <topic4>, <topic5>',\n",
"'fitness_&_health': '<topic1>, <topic2>, <topic3>, <topic4>, <topic5>',\n",
"'business_&_entrepreneurs': '<topic1>, <topic2>, <topic3>, <topic4>, <topic5>',\n",
"'family_&_relationships': '<topic1>, <topic2>, <topic3>, <topic4>, <topic5>',\n",
"'hobbies': '<topic1>, <topic2>, <topic3>, <topic4>, <topic5>',\n",
"'gaming': '<topic1>, <topic2>, <topic3>, <topic4>, <topic5>',\n",
"'learning_&_education': '<topic1>, <topic2>, <topic3>, <topic4>, <topic5>',\n",
"'food_&_dining': '<topic1>, <topic2>, <topic3>, <topic4>, <topic5>',\n",
"'travel_&_adventure': '<topic1>, <topic2>, <topic3>, <topic4>, <topic5>',\n",
"'fashion_&_style': '<topic1>, <topic2>, <topic3>, <topic4>, <topic5>',\n",
"}}\n",
```

In certain embodiments, a selected substitution candidate relevant to the target locale is determined for each of the popular-topic categories of the classified textual portions of the contents by the substitution candidate determination engine 208. For example, based on the set of substitution candidates relevant to the "UK" target locale of "[Premiere league, Wimbledon, Rugby Union, Cricket, and Formula 1]," the selected substitution candidate can be determined to be "Premiere league." In some embodiments, the selected substitution candidate is determined by the substitution candidate determination engine 208 from the set of substitution candidates for each of the popular-topic categories based on the substitution candidate of each set of substitution candidates with a greatest number of search queries in the target locale over a selected period of time (e.g., a year, a month, a week, or any period of time) accessed via a trend analysis engine 210. In certain embodiments, the substitution candidate determination engine 208 determines the selected substitution candidate by applying a prompt to a language model with each of the sets of substitution candidates relevant to the target locale for each of the popular-topic categories (e.g., as output previously by the language model) and instructions to determine the substitution candidate with the greatest number of search queries in the target locale over a selected period of time via an API to the trend analysis engine 210 (e.g., Google® Trends API).

In certain embodiments, the substitution candidate determination engine 208 generates a mapping via a mapping engine 211 that maps each representation of the subjects of each of the popular-topic categories to a corresponding selected substitution candidate relevant to the target locale. For example, the mapping engine 211 can generate the mapping by applying a prompt to a language model that includes instructions to map each representation of the subjects of each of the popular-topic categories to a corresponding selected substitution candidate relevant to the target locale. In certain embodiments, the instructions to map each representation of the subjects of each of the popular-topic categories to a corresponding selected substitution candidate relevant to the target locale can be included in a prompt with the instructions to determine the selected substitution candidate and/or set of substitution candidates.

In certain embodiments, the refined content is generated by replacing each classified textual portion of the content with a corresponding substituted textual portion based on the corresponding selected substitution candidate relevant to the target locale by a textual portion replacement engine 212. For example, for the selected substitution candidate of "Premiere league," the words "touchdowns" and "Super Bowl" corresponding to the subject "NFL" can be changed to "goals" and "final match," respectively.

In certain embodiments, the textual portion replacement engine 212 generates the refined content by replacing each classified textual portion of the content with a corresponding substituted textual portion relevant to the target locale by applying a prompt to a language model with the content, the classified textual portions of the content, the mapping that maps each representation of the subjects of each of the popular-topic categories to a corresponding selected substitution candidate relevant to the target locale, and instructions to replace each classified textual portion of the content with a corresponding substituted textual portion based on the corresponding selected substitution candidate relevant to the target locale from the mapping. An example generating refined content by replacing each classified textual portion of the content with a corresponding substituted textual portion relevant to the target locale is shown in FIG. 7. As can be understood from diagram 700, the terms from example advertisement 704 classified in popular-topic categories 702 are replaced with corresponding substituted text relevant to the target locale in the example refined advertisement 706.

Returning to FIG. 2, transcreated content 236 is generated by a communication-interpretation content-adaptation engine 214 by applying communication-interpretation rules relevant to the target locale to the refined content. In certain embodiments, the communication-interpretation rules relevant to the target locale are generated by a communication-interpretation rules generation engine 216 using a communication-interpretation taxonomy with communication-interpretation categories. An example of a communication-interpretation taxonomy is shown in FIG. 5. As can be understood from diagram 500, the communication-interpretation taxonomy 502 can include (1) a linguistic communication-interpretation taxonomy with linguistic communication-interpretation categories (e.g., based on linguistic equivalence dimensions) that can be used to classify the linguistic nuances for interpreting communications and/or (2) a cultural communication-interpretation taxonomy with cultural communication-interpretation categories (e.g., based on cultural equivalence dimensions and/or cultural resonance dimensions) that can be used to classify the cultural nuances for interpreting communications.

Returning to FIG. 2, in certain embodiments, the communication-interpretation rules generation engine 216 can include a linguistic communication-interpretation rules generation engine 218 to generate linguistic communication-interpretation rules describing the linguistic nuances for interpreting communications for a given locale. For example, for an "equivalence at word level" category for the UK, a rule can be generated by a language model indicating the use British English spelling, such as "colour" instead of "color." In certain embodiments, the communication-interpretation rules generation engine 216 can include a cultural communication-interpretation rules generation engine 220 to generate cultural communication-interpretation rules describing the cultural nuances for interpreting communications for a given locale. For example, for an "individualism" category for the UK, a rule can be generated by a language model indicating to emphasize personal achievement and individual rights.

In certain embodiments, the communication-interpretation rules generation engine 216 generates communication-interpretation rules relevant to the target locale by applying a prompt to a language model with the communication-interpretation taxonomy and instructions to generate rules relevant to the target locale for each of the communication-interpretation categories of the communication-interpretation taxonomy.

An example of a prompt to a language model to generate linguistic communication-interpretation rules for a target locale based on linguistic equivalence dimensions is provided as follows:

```
"    "prompt = PromptTemplate(\n",
"        input_variables= ['locale'],\n",
"        template= \"\"\"\n",
"As a friendly AI transcreation agent your task is help transcreate a creative brief for
        linguistic equivalence.\n",
"\n",
"You are given a locale.\n",
"==========================================================\n",
"{locale}\n",
"==========================================================\n",
"\n",
"Task Objective:\n",
"\n",
"1. Craft the linguistic equivalence rules for the given locale in a bulleted list for these
        dimensions:\n",
"- Equivalence at word level\n",
"- Equivalence above word level\n",
"- Grammatical equivalence\n",
"- Textual equivalence - thematic and word order\n",
"- Textual equivalence - Cohesion\n",
"- Pragmatic equivalence\n",
```

-continued

```
"\n",
"\"\"\"\"\n",
")"
```

An example of a prompt to a language model to generate cultural communication-interpretation rules for a target locale based on cultural resonance dimensions is provided as follows:

```
"    "prompt = PromptTemplate(\n",
"      input_variables= ['locale'],\n",
"      template= \"\"\"\n",
"As a friendly AI transcreation agent your task is help transcreate a creative brief for a given
        market locale for cultural resonance.\n",
"\n",
"You are given a locale.\n",
"===========================================================\n",
"{locale}\n",
"===========================================================\n",
"\n",
"Task Objective:\n",
"\n",
"Craft the cultural resonance rules for the given locale in a bulleted list for these
        dimensions:\n",
"-    Alignment with core values, cultural archetypes, historical moments, time/decade
        meanings (e.g. Coca-cola, Levi's)\n",
"- Adapting to trends with currency value (e.g., AI, sustainability)\n",
"- Leveraging opposing meanings to create opportunities for processing and relating (e.g.,
        Mountain Dew's \"slacker\" mentality in the goal-driven 90's)\n",
"- Being symbolic of social roles (e.g., AllBirds symbolic of sustainability)\n",
"- Being symbolic of the meanings of the product category (e.g., Harley-Davidson symbolic
        of motorcycling)\n",
"- Being multivocal (e.g, Martha Stewart)\n",
"- Community building (e.g., Coke)\n",    "\n",
"\"\"\"\n",
")"
```

In certain embodiments, a communication-interpretation content-adaptation generation engine 222 generates the transcreated content by applying a prompt to a language model with the refined content, communication-interpretation rules relevant to the target locale, and instructions to generate the transcreated content. In certain embodiments, communication-interpretation content-adaptation generation engine 222 includes instructions in the prompt to the language model to identify each of the changes made to the refined content in generating the transcreated content with respect to the communication-interpretation rules relevant to the target locale. An example of transcreated content and the identified changes with respect to communication-interpretation rules is shown in FIG. 8A. As can be understood from diagram 800A, among other adaptations with respect to the UK locale, the term "football fans and coffee lovers" in the example refined advertisement 804 (e.g., example refined advertisement 706 of FIG. 7) is adapted to the term "football enthusiasts and coffee aficionados" in the example refined advertisement 806 based on linguistic equivalence rules of communication interpretation rules 802; the term "what better way . . . " in the example refined advertisement 804 is adapted to "and there's no" in the example refined advertisement 806 based on cultural equivalence rules of communication interpretation rules 802; and the term "enjoy iconic British football shows" in the example refined advertisement 804 is adapted to "relish iconic football matches" in the example refined advertisement 806 based on cultural resonance rules of communication interpretation rules 802.

An example of a prompt to a language model to generate the transcreated content is provided as follows:

```
"prompt = PromptTemplate(\n"
"    input_variables= ['locale', 'original_content', 'topics', 'linguistic_equivalence_rules',
        'cultural_resonance_rules', 'cultural_equivalence_rules'],\n",
" template= \"\"\"\n",
"As a friendly AI transcreation agent, your task is adapt the topics in the original content to
    be effective in a new locale based on the below rules.\n",
"\n",
"###LOCALE\n",
"===========================================================\n",
"{locale}\n",
"===========================================================\n",
"\n",
"###ORIGINAL CONTENT\n",
"===========================================================\n",
"{original_content}\n",
```

```
"========================================================\n",
"\n",
"###TOPICS\n",
"========================================================\n",
"{topics}\n",
"========================================================\n",
"\n",
"### LINGUISTIC EQUIVALENCE RULES\n",
"========================================================\n",
"{linguistic_equivalence_rules}\n",
"========================================================\n",
"\n",
"### CULTURAL RESONANCE RULES\n",
"========================================================\n",
"{cultural_resonance_rules}\n",
"========================================================\n",
"\n",
"### CULTURAL EQUIVALANCE RULES\n",
"========================================================\n",
"{cultural_equivalence_rules}\n",
"========================================================\n",
"\n",
"Task Objective:\n",
"\n",
"1. Re-write the topics based on the rules.\n",
"2. DONOT use any cultural stereotypes.\n",
"3. Update the original content based on the updated topics\n",
"4. List all updates made to the topics for adhering to LINGUISTIC EQUIVALENCE
    RULES\n",
"5. List all updates made to the topics for adhering to CULTURAL RESONANCE
    RULES\n",
"6. List all updates made to the topics for adhering to CULTURAL EQUIVALANCE
    RULES\n",
"\"\"\"\n",
"    \n",
")"
```

Returning to FIG. 2, in some embodiments, the communication-interpretation rules generation engine 216 and/or the communication-interpretation content-adaptation generation engine 222 can utilize a language model (e.g., language model 106 of FIG. 1) that is fine-tuned using locale-specific content (e.g., pre-existing literature from the locale) to and/or generate rules for the specific locale and/or generate transcreated content. For example, if a language model is not well-trained on content from a specific locale, additional locale-specific content can be used to train and/or fine-tune the language model in order to generate rules for the specific locale and/or generate transcreated content.

In certain embodiments, the communication-interpretation content-adaptation generation engine 222 and/or a communication-interpretation content-adaptation evaluation engine 224 generates an evaluation of the transcreated content with respect to communication-interpretation categories of the communication-interpretation taxonomy. For example, the communication-interpretation content-adaptation generation engine 222 and/or the communication-interpretation content-adaptation evaluation engine 224 generates the evaluation of the transcreated content by applying a prompt to a language model with instructions to generate the evaluation with respect to the communication-interpretation categories. In certain embodiments, the instructions to generate the evaluation can be included in the prompt with the instructions to generate the transcreated content. In some embodiments, any content, such as manually written content, can be applied to the communication-interpretation content-adaptation evaluation engine 224 to generate an evaluation of the content with respect to the communication-interpretation categories.

In some embodiments, the communication-interpretation content-adaptation generation engine 222 generates the evaluation by including reasoning behind changes to the refined content in generating the transcreated content with respect to the communication-interpretation categories. An example of reasoning behind changes to the refined content in generating the transcreated content with respect to communication-interpretation categories is shown in FIG. 8B. As can be understood from diagram 800B, the example reasoning for transcreated content 808 includes the reasoning behind each of the adaptations of the refined content in generating the transcreated content with respect to each of the communication-interpretation categories of communication-interpretation rules 802 of FIG. 8A. In certain embodiments, by instructing a language model to include reasoning for changes to the refined content in generating the transcreated content, hallucinations by the language model can be reduced.

Returning to FIG. 2, in some embodiments, the communication-interpretation content-adaptation evaluation engine 224 generates the evaluation by including scores of the transcreated content with respect to communication-interpretation categories of the communication-interpretation taxonomy. For example, scores can be included for each of the communication-interpretation categories and/or any combination thereof, such as a score for all of the linguistic communication-interpretation rules or all of the cultural communication-interpretation rules corresponding to the target locale. In certain embodiments, if the scoring for the communication-interpretation categories is below a threshold value, the communication-interpretation content-adaptation generation engine 222 can re-generate the transcreated content. In certain embodiments, by instructing a language model to score the transcreated content with respect to communication-interpretation categories, parametrizable metrics can be generated to optimize the language model and/or output from the language model.

The transcreated content 236 is then displayed to the user for approval and/or further editing of the transcreated content 236. In certain embodiments, the evaluation is provided to the user. For example, when the evaluation includes reasoning behind the changes, the user can understand why the language model made each of the changes. As another example, if the evaluation includes scoring for the communication-interpretation categories, the user can determine whether to re-generate the content.

Exemplary Implementations of Transcreation of Textual Content Using a Language Model With reference now to FIGS. 9-11, FIGS. 9-11 provide method flows related to facilitating transcreation of textual content using a language model, in accordance with embodiments of the present technology. Each block of method 900, 1000 and 1100 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 9-11 are exemplary only and not intended to be limiting. As can be appreciated, in some embodiments, method flows 900-1100 can be implemented, at least in part, to facilitate transcreation of textual content using a language model.

Turning to FIG. 9, a flow diagram 900 is provided showing an embodiment of a method 900 for facilitating transcreation of textual content using a language model, in accordance with embodiments described herein. Initially, at block 902, a selection of content and a target locale are accessed by a content transcreation manager (e.g., content transcreation manager of FIG. 2). For example, a user inputs an advertisement written for a source locale and selects a target locale for transcreation of the advertisement.

At block 904, a popular-topic substitution engine generates refined content from the content and the target locale by prompting a language model to (1) determine a corresponding subject of classified textual portions of the content with respect to a set of popular-topic categories of a popular-topic taxonomy, (2) determine a corresponding substitution subject relevant to the target locale for each popular-topic category of the set of popular-topic categories based on the corresponding subject of each popular-topic category, and (3) replace the classified textual portions of the content with text corresponding to the corresponding substitution subject.

In certain embodiments, a popular-topic classification engine classifies textual portions of the content with respect to each popular topic category of the set of popular-topic categories by prompting the language model to (1) classify corresponding textual portions of the content with respect to the popular-topic categories of the popular-topic taxonomy and (2) determine the corresponding subject of each popular topic category of the set of popular-topic categories based on the corresponding textual portions of the content classified with respect to each popular-topic category.

In certain embodiments, a substitution candidate determination engine determines a corresponding set of substitution candidate subjects for each popular-topic category of the set of popular-topic categories by prompting the language model to determine the corresponding set of substitution candidate subjects relevant to the target locale based on the corresponding subject with respect to each popular-topic category of the set of popular-topic categories. In certain embodiments, the substitution candidate determination engine determines the corresponding substitution subject for each popular-topic category of the set of popular-topic categories based on the corresponding substitution candidate subject of the corresponding set of substitution candidate subjects with a greatest number of search queries in the target locale over a selected period of time via a trend analysis engine.

In certain embodiments, a mapping engine generates a mapping of the corresponding subject of the classified textual portions of the content to the corresponding substitution subject for each popular-topic category of the set of popular-topic categories. In certain embodiments, a textual portion replacement engine generates the refined content by prompting the language model to replace the classified textual portions of the content with the text corresponding to the corresponding substitution subject for each popular-topic category of the set of popular-topic categories based on the mapping.

At block 906, a communication-interpretation content-adaptation engine generates transcreated content by prompting the language model to generate the transcreated content based on the refined content and communication-interpretation rules relevant to the target locale. In certain embodiments, a communication-interpretation rules generation engine generates the communication-interpretation rules by prompting the language to generate rules relevant to the target locale based on linguistic communication-interpretation categories of a linguistic communication-interpretation taxonomy and cultural communication-interpretation categories of a cultural communication-interpretation taxonomy.

In certain embodiments, a communication-interpretation content-adaptation generation engine generates the transcreated content with a representation of changes made to the refined content with respect to each of the communication-interpretation rules by prompting the language model to identify each of the changes made to the refined content with respect to each of the communication-interpretation rules. In certain embodiments, the communication-interpretation content-adaptation generation engine generates the transcreated content with a representation of reasoning for changes made to the refined content with respect to each of the communication-interpretation rules by prompting the language model to generate the reasoning for each of the changes made to the refined content with respect to each of the communication-interpretation rules. In certain embodiments, a communication-interpretation content-adaptation evaluation engine generates a representation of a score of the transcreated content with respect to the communication-interpretation rules by prompting the language model to score the transcreated content with respect to the communication-interpretation rules.

At block 908, the transcreated content is displayed. In this regard, the user can approve and/or edit the transcreated content. In certain embodiments, the transcreated content is displayed with an indication of the changes made with respect to the refined content, reasoning for the changes, and/or the score of the transcreated content.

Turning now to FIG. 10, a flow diagram 1000 is provided showing an embodiment of a method 1000 facilitating popular-topic substitution for a target locale, in accordance with embodiments described herein. Initially, at block 1002, a corresponding subject of classified textual portions of the content are determined with respect to a set of popular-topic categories of a popular-topic taxonomy. In certain embodiments, a popular-topic classification engine classifies textual portions of the content with respect to each popular topic category of the set of popular-topic categories by prompting the language model to (1) classify corresponding textual portions of the content with respect to the popular-topic categories of the popular-topic taxonomy and (2) determine the corresponding subject of each popular topic category of the set of popular-topic categories based on the corresponding textual portions of the content classified with respect to each popular-topic category.

At block 1004, a corresponding set of substitution candidate subjects is determined for each popular-topic category of the set of popular-topic categories by prompting the language model to determine the corresponding set of substitution candidate subjects relevant to the target locale based on the corresponding subject with respect to each popular-topic category of the set of popular-topic categories. At block 1006, the corresponding substitution subject for each popular-topic category of the set of popular-topic categories is determined based on the corresponding substitution candidate subject of the corresponding set of substitution candidate subjects with a greatest number of search queries in the target locale over a selected period of time via a trend analysis engine.

At block 1008, a mapping of the corresponding subject of the classified textual portions of the content to the corresponding substitution subject for each popular-topic category of the set of popular-topic categories is generated. At block 1010, the refined content is generated by prompting the language model to replace the classified textual portions of the content with the text corresponding to the corresponding substitution subject for each popular-topic category of the set of popular-topic categories based on the mapping.

Turning now to FIG. 11, a flow diagram 1100 is provided showing an embodiment of a method 1100 for facilitating communication-interpretation content-adaptation, in accordance with embodiments described herein. Initially, at block 1102, a communication-interpretation taxonomy is generated that includes a linguistic communication-interpretation taxonomy with linguistic communication-interpretation categories and a cultural communication-interpretation taxonomy with cultural communication-interpretation categories.

At block 1104, communication-interpretation rules relevant to the target locale are generated by prompting the language to generate rules relevant to the target locale based on the communication-interpretation taxonomy (e.g., the linguistic communication-interpretation categories and the cultural communication-interpretation categories).

At block 1106, along with the transcreated content, a representation of reasoning for changes made to the refined content with respect to each of the communication-interpretation rules is generated by prompting the language model to generate the reasoning for each of the changes made to the refined content with respect to each of the communication-interpretation categories. At block 1108, the transcreated content is displayed with the reasoning to provide an explanation of the changes to the user. In this regard, the user can approve and/or edit the transcreated content based on the reasoning, such as by re-generating the transcreated content.

At block 1110, along with the transcreated content, a representation of a score of the transcreated content is generated with respect to the communication-interpretation categories by prompting the language model to score the transcreated content with respect to a communication-interpretation rule for the target locale corresponding to a category of the communication-interpretation taxonomy. At block 1112, the transcreated content is displayed with the score to provide an indication of whether the transcreated meets the conditions of the corresponding rule for the target locale. In this regard, the user can approve and/or edit the transcreated content based on the score, such as by re-generating the transcreated content.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 12:
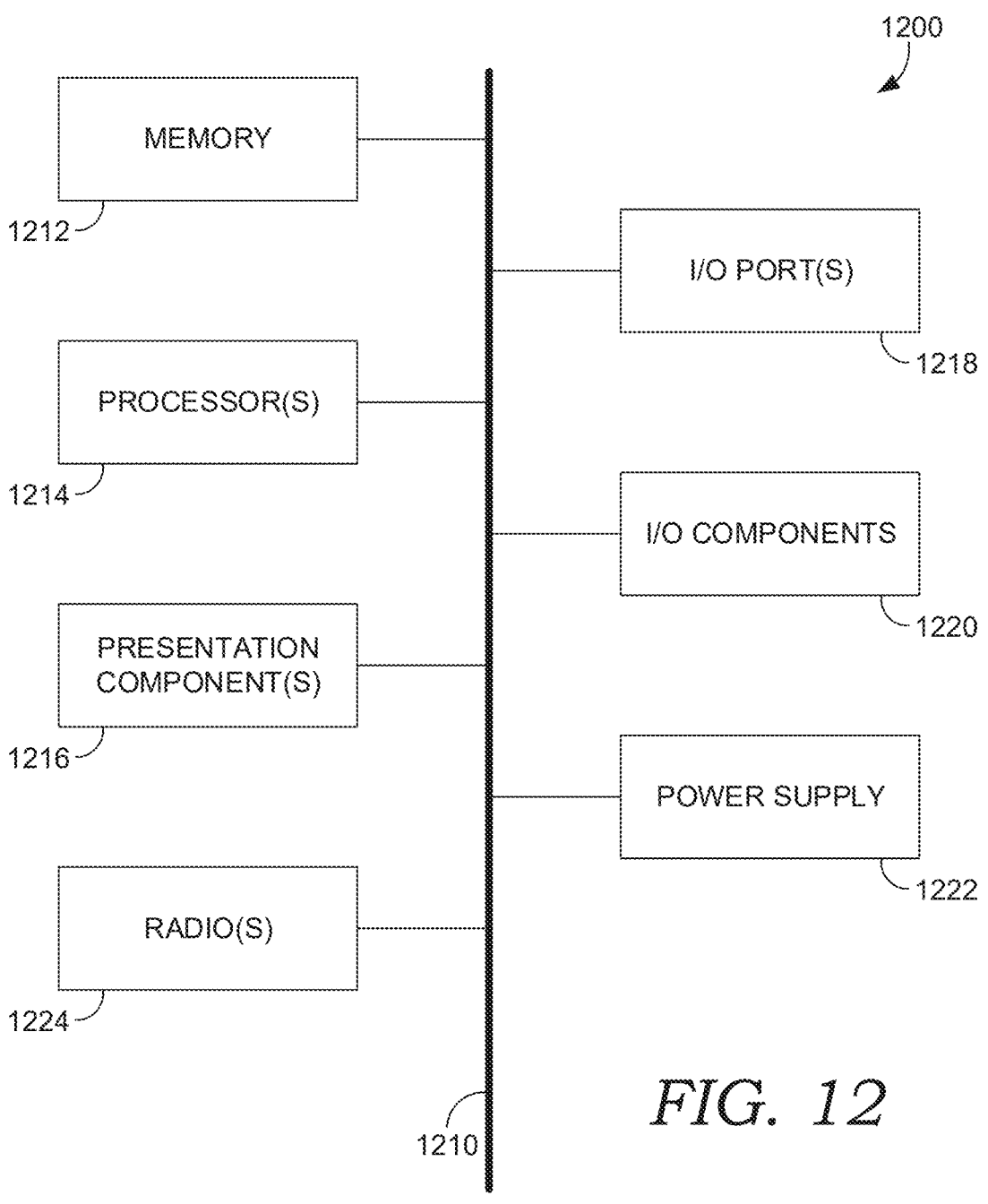
FIG. 12 is a block diagram of an example computing device in which embodiments of the present disclosure can be employed.

Referring to the drawings in general, and initially to FIG. 12 in particular, an exemplary operating environment for implementing aspects of the technology described herein is shown and designated generally as computing device 1200. Computing device 1200 is just one example of a suitable computing environment and is not intended to suggest any limitation as to the scope of use or functionality of the technology described herein. Neither should the computing device 1200 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 12, computing device 1200 includes a bus 1210 that directly or indirectly couples the following devices: memory 1212, one or more processors 1214, one or more presentation components 1216, input/output (I/O) ports 1218, I/O components 1220, an illustrative power supply 1222, and a radio(s) 1224. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 12 is merely illustrative of an exemplary computing device that can be used in connection with one or more aspects of the technology described herein. Distinction is not made between such categories as "workstation," "server," "laptop," and "handheld device," as all are contemplated within the scope of FIG. 12 and refer to "computer" or "computing device."

Computing device 1200 typically includes a variety of computer-readable media. Computer-readable media can be any available media that can be accessed by computing device 1200 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1212 includes computer storage media in the form of volatile and/or nonvolatile memory. The memory 1212 may be removable, non-removable, or a combination thereof. Exemplary memory includes solid-state memory, hard drives, and optical-disc drives. Computing device 1200 includes one or more processors 1214 that read data from various entities such as bus 1210, memory 1212, or I/O components 1220. Presentation component(s) 1216 present data indications to a user or other device. Exemplary presentation components 1216 include a display device, speaker, printing component, and vibrating component. I/O port(s) 1218 allow computing device 1200 to be logically coupled to other devices including I/O components 1220, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1214 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1200. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

A computing device may include radio(s) 1224. The radio 1224 transmits and receives radio communications. The computing device may be a wireless terminal adapted to receive communications and media over various wireless networks. Computing device 1200 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. One or more computer-readable media having a plurality of executable instructions embodied thereon, which, when executed by one or more processors, cause the one or more processors to perform a method comprising:

prior to generating transcreated content, generating, by a popular-topic substitution engine, refined content from content and a target locale by prompting a language model to (1) determine a representation of classified textual portions of the content with respect to a popular-topic category of a popular-topic taxonomy, (2) determine a substitution subject relevant to the target locale based on the representation and the popular-topic category, and (3) replace the classified textual portions of the content with text corresponding to the substitution subject, wherein the target locale corresponds to a particular geographic region;

generating, by a communication-interpretation content-adaptation engine, the transcreated content by prompting the language model to generate the transcreated content based on the refined content and communication-interpretation rules relevant to the target locale; and causing display of the transcreated content.

2. The one or more computer-readable media of claim 1, wherein determining the representation of the classified textual portions of the content further comprises:

classifying, by a popular-topic classification engine, textual portions of the content with respect to the popular-topic category by prompting the language model to (1) classify corresponding textual portions of the content with respect to popular-topic categories of the popular-topic taxonomy and (2) determine a corresponding subject of each of the popular-topic categories based on the corresponding textual portions of the content of each popular-topic category.

3. The one or more computer-readable media of claim 1, wherein determining the substitution subject relevant to the target locale further comprises:

determining, by a substitution candidate determination engine, a set of substitution candidate subjects by prompting the language model to determine the set of substitution candidate subjects relevant to the target locale based on the representation and the popular-topic category; and determining, by the substitution candidate determination engine, the substitution subject based on a corresponding substitution candidate subject of the set of substitution candidate subjects with a greatest number of search queries in the target locale over a selected period of time via a trend analysis engine.

4. The one or more computer-readable media of claim 1, wherein replacing the classified textual portions of the content with the text corresponding to the substitution subject further comprises:

generating, by a mapping engine, a mapping of the representation of the classified textual portions of the content to the substitution subject for the popular-topic category; and generating, by a textual portion replacement engine, the refined content by prompting the language model to replace the classified textual portions of the content with the text corresponding to the substitution subject based on the mapping.

5. The one or more computer-readable media of claim 1, the method further comprising:

generating, by a communication-interpretation rules generation engine, the communication-interpretation rules by prompting the language model to generate rules relevant to the target locale based on linguistic communication-interpretation categories of a linguistic communication-interpretation taxonomy and cultural communication-interpretation categories of a cultural communication-interpretation taxonomy.

6. The one or more computer-readable media of claim 1, wherein generating the transcreated content further comprises:

generating, by a communication-interpretation content-adaptation generation engine, the transcreated content comprising a corresponding representation of changes made to the refined content with respect to each of the communication-interpretation rules by prompting the language model to identify each of the changes made to the refined content with respect to each of the communication-interpretation rules.

7. The one or more computer-readable media of claim 1, wherein generating the transcreated content further comprises:

generating, by a communication-interpretation content-adaptation generation engine, the transcreated content comprising a corresponding representation of reasoning for changes made to the refined content with respect to each of the communication-interpretation rules by prompting the language model to generate the reasoning for each of the changes made to the refined content with respect to each of the communication-interpretation rules.

8. The one or more computer-readable media of claim 1, the method further comprising:

generating, by a communication-interpretation content-adaptation evaluation engine, a corresponding representation of a score of the transcreated content with respect to the communication-interpretation rules by prompting the language model to score the transcreated content with respect to the communication-interpretation rules.

9. A computer-implemented method comprising:

accessing, by a content transcreation manager, a selection of content and a target locale, wherein the target locale corresponds to a particular geographic region;

prior to generating transcreated content, generating, by a popular-topic substitution engine, refined content from the content and the target locale by prompting a language model to (1) determine a representation of a subject of classified textual portions of the content with respect to a popular-topic category of a popular-topic taxonomy, (2) determine a substitution subject relevant to the target locale based on the subject and the popular-topic category, and (3) replace the classified textual portions of the content with text corresponding to the substitution subject;

generating, by a communication-interpretation content-adaptation engine, the transcreated content by prompting the language model to generate the transcreated content based on the refined content and communication-interpretation rules relevant to the target locale; and causing display of the transcreated content.

10. The computer-implemented method of claim 9, wherein determining the representation of the subject of the classified textual portions of the content further comprises:

classifying, by a popular-topic classification engine, textual portions of the content with respect to the popular-topic category by prompting the language model to (1) classify corresponding textual portions of the content with respect to popular-topic categories of the popular-topic taxonomy and (2) determine a corresponding subject of each of the popular-topic categories based on the corresponding textual portions of the content classified with respect to each popular-topic category.

11. The computer-implemented method of claim 9, wherein determining the substitution subject relevant to the target locale further comprises:

determining, by a substitution candidate determination engine, a set of substitution candidate subjects by prompting the language model to determine the set of substitution candidate subjects relevant to the target locale based on the subject and the popular-topic category; and determining, by the substitution candidate determination engine, the substitution subject based on a corresponding substitution candidate subject of the set of substitution candidate subjects with a greatest number of search queries in the target locale over a selected period of time via a trend analysis engine.

12. The computer-implemented method of claim 9, wherein replacing the classified textual portions of the content with the text corresponding to the substitution subject further comprises:

generating, by a mapping engine, a mapping of the subject of the classified textual portions of the content to the substitution subject for the popular-topic category; and generating, by a textual portion replacement engine, the refined content by prompting the language model to replace the classified textual portions of the content with the text corresponding to the substitution subject based on the mapping.

13. The computer-implemented method of claim 9, further comprising:

generating, by a communication-interpretation rules generation engine, the communication-interpretation rules by prompting the language model to generate rules relevant to the target locale based on linguistic communication-interpretation categories of a linguistic communication-interpretation taxonomy and cultural communication-interpretation categories of a cultural communication-interpretation taxonomy.

14. The computer-implemented method of claim 9, wherein generating the transcreated content further comprises:

generating, by a communication-interpretation content-adaptation generation engine, the transcreated content comprising a corresponding representation of changes made to the refined content with respect to each of the communication-interpretation rules by prompting the language model to identify each of the changes made to the refined content with respect to each of the communication-interpretation rules.

15. The computer-implemented method of claim 9, wherein generating the transcreated content further comprises:

generating, by a communication-interpretation content-adaptation generation engine, the transcreated content comprising a corresponding representation of reasoning for changes made to the refined content with respect to each of the communication-interpretation rules by prompting the language model to generate the reasoning for each of the changes made to the refined content with respect to each of the communication-interpretation rules.

16. The computer-implemented method of claim 9, further comprising:

generating, by a communication-interpretation content-adaptation evaluation engine, a corresponding representation of a score of the transcreated content with respect to the communication-interpretation rules by prompting the language model to score the transcreated content with respect to the communication-interpretation rules.

17. A computing system comprising:

a processor; and a non-transitory computer-readable medium having stored thereon instructions that when executed by the processor, cause the processor to perform operations including:

accessing, by a content transcreation manager, a selection of content and a target locale, wherein the target locale corresponds to a particular geographic region;

prior to generating transcreated content, generating, by a popular-topic substitution engine, refined content from the content and the target locale by prompting a language model to (1) determine a corresponding subject of classified textual portions of the content with respect to a set of popular-topic categories of a popular-topic taxonomy, (2) determine a corresponding substitution subject relevant to the target locale for each popular-topic category of the set of popular-topic categories based on the corresponding subject of each popular-topic category, and (3) replace the classified textual portions of the content with text corresponding to the corresponding substitution subject;

generating, by a communication-interpretation content-adaptation engine, the transcreated content by prompting the language model to generate the transcreated content based on the refined content and communication-interpretation rules relevant to the target locale; and causing display of the transcreated content.

18. The computing system of claim 17, wherein determining the corresponding subject of the classified textual portions of the content with respect to the set of popular-topic categories further comprises:

classifying, by a popular-topic classification engine, textual portions of the content with respect to each popular topic category of the set of popular-topic categories by prompting the language model to (1) classify corresponding textual portions of the content with respect to popular-topic categories of the popular-topic taxonomy and (2) determine the corresponding subject of each popular topic category of the set of popular-topic categories based on the corresponding textual portions of the content classified with respect to each popular-topic category.

19. The computing system of claim 17, wherein determining the corresponding substitution subject relevant to the target locale for each popular-topic category of the set of popular-topic categories further comprises:

determining, by a substitution candidate determination engine, a corresponding set of substitution candidate subjects for each popular-topic category of the set of popular-topic categories by prompting the language model to determine the corresponding set of substitution candidate subjects relevant to the target locale based on the corresponding subject with respect to each popular-topic category of the set of popular-topic categories; and determining, by the substitution candidate determination engine, the corresponding substitution subject for each popular-topic category of the set of popular-topic categories based on a corresponding substitution candidate subject of the corresponding set of substitution candidate subjects with a greatest number of search queries in the target locale over a selected period of time via a trend analysis engine.

20. The computing system of claim 17, wherein replacing the classified textual portions of the content with the text corresponding to the corresponding substitution subject further comprises:

generating, by a mapping engine, a mapping of the corresponding subject of the classified textual portions of the content to the corresponding substitution subject for each popular-topic category of the set of popular-topic categories; and generating, by a textual portion replacement engine, the refined content by prompting the language model to replace the classified textual portions of the content with the text corresponding to the corresponding substitution subject for each popular-topic category of the set of popular-topic categories based on the mapping.

* * * * *